US011285643B2

(12) United States Patent
Sharifishourabi et al.

(10) Patent No.: US 11,285,643 B2
(45) Date of Patent: Mar. 29, 2022

(54) THERMOSET POROUS COMPOSITES AND METHODS THEREOF

(71) Applicant: UNIVERSITÉ LAVAL, Québec (CA)

(72) Inventors: Gholamali Sharifishourabi, Québec (CA); Denis Rodrigue, Québec (CA)

(73) Assignee: UNIVERSITÉ LAVAL, Québec (CA)

( * ) Notice: Subject to any disclaimer, the term of this patent is extended or adjusted under 35 U.S.C. 154(b) by 0 days.

(21) Appl. No.: 17/290,258

(22) PCT Filed: Oct. 23, 2019

(86) PCT No.: PCT/CA2019/051505
§ 371 (c)(1),
(2) Date: Apr. 30, 2021

(87) PCT Pub. No.: WO2020/087155
PCT Pub. Date: May 7, 2020

(65) Prior Publication Data
US 2021/0362383 A1    Nov. 25, 2021

Related U.S. Application Data

(60) Provisional application No. 62/754,775, filed on Nov. 2, 2018.

(51) Int. Cl.
C08J 9/12         (2006.01)
C08J 9/34         (2006.01)
B29C 35/02        (2006.01)
B29C 44/04        (2006.01)
B29C 44/34        (2006.01)
C08J 5/24         (2006.01)
C08J 9/00         (2006.01)
C08K 7/06         (2006.01)
C08G 59/44        (2006.01)

(52) U.S. Cl.
CPC ...... B29C 44/0423 (2013.01); B29C 35/0288 (2013.01); B29C 44/3415 (2013.01); C08G 59/44 (2013.01); C08J 5/243 (2021.05); C08J 9/0085 (2013.01); C08J 9/122 (2013.01); C08J 9/34 (2013.01); C08K 7/06 (2013.01); C08J 2201/026 (2013.01); C08J 2203/06 (2013.01); C08J 2300/24 (2013.01); C08J 2300/30 (2013.01); C08J 2363/00 (2013.01)

(58) Field of Classification Search
CPC ........... B29C 44/0423; B29C 35/0288; B29C 44/3415; C08G 59/44; C08J 5/243; C08J 9/0085; C08J 9/122; C08J 9/34; C08J 2201/026; C08J 2203/06; C08J 2300/24; C08J 2300/30; C08J 2363/00; C08K 7/06
See application file for complete search history.

(56) References Cited

U.S. PATENT DOCUMENTS

| 2,889,291 | A | * | 6/1959 | Moore | C08J 9/122 521/130 |
| 4,483,888 | A |   | 11/1984 | Wu | |
| 7,473,715 | B2 |   | 1/2009 | Czaplicki et al. | |
| 7,838,108 | B2 | * | 11/2010 | Thiagarajan | C08J 9/0071 428/315.7 |
| 8,262,955 | B2 |   | 9/2012 | Dixit et al. | |
| 2005/0183903 | A1 | * | 8/2005 | Stevenson | C08J 9/06 181/293 |
| 2009/0163609 | A1 | * | 6/2009 | Lassor | C08J 9/0085 521/55 |
| 2016/0030625 | A1 |   | 2/2016 | Mrozek et al. | |

FOREIGN PATENT DOCUMENTS

WO    2006015440    2/2006

OTHER PUBLICATIONS

Celieveld et al., "Mechanical characterization of ashape morphing smart composite with embedded shape memory alloys in a shape memory polymer matrix", Journal of Intelligent Material Systems and Structures 2016, vol. 27(15) 2038-2048.*
Withers ef al., "Improved mechanical properties of an epoxy glass-fiber composite reinforced with surface organomodified nanoclays", Composites: Part B 72 (2015) 175-182.*
Adam et al., "Hierarchically ordered foams derived from polysiloxanes with catalytically active coatings", Journal of the European Ceramic Society 34 (Jan. 17, 2014) 1715-1725.
Di Maio et al., "Foaming of polymers with supercritical fluids and perspectives on the current knowledge gaps and challenges", The Journal of Supercritical Fluids 134 (2018) 157-166. Available online Nov. 16, 2017.
Kaufman et al., "Green Biomass Materials in Polyurethane Foams", Air & Waste vol. 43, Sep. 1993, 1253-1259.
Koohbor et al., "Design optimization of continuously and discretely graded foam materials for efficient energy absorption", Materials and Design 102 (Apr. 13, 2016) 151-161.
Lyu et al., "Effect of pre-curing process on epoxy resin foaming using carbon dioxide as blowing agent", Journal of Cellular Plastics 2017, vol. 53(2) 181-197. (The year of publication is sufficiently earlier than the effective U.S. filing date so that the particular month of publication is not an issue).
Malewska et al., "physical and mechanical properties of rigid polyurethane foams modified with polystyrene beads", e-Polymers Jul. 10, 2012, No. 055.
Stefani et al., "Characterization of Epoxy Foams", Journal of Applied Polymer Science, vol. 90, 2992-2996 (Mar. 25, 2003).

(Continued)

Primary Examiner — Irina S Zemel
(74) Attorney, Agent, or Firm — Bereskin & Parr LLP/S.E.N.C.R.L., s.r.l.

(57) ABSTRACT

There is provided herein thermoset porous polymer composites a methods for producing such composites. The method comprises: preparing a mixture comprising a resin, optionally a curing agent, and dry ice; optionally casting the mixture; curing the mixture to obtain the porous composite; and optionally controlling at least one of a reaction rate and an expansion rate of the mixture during the curing.

7 Claims, 15 Drawing Sheets

(56) References Cited

OTHER PUBLICATIONS

Antunes et al., "Multifunctional polymer foams with carbon nanoparticles", Progress in Polymer Science 39 (2014) 486-509. (The year of publication is sufficiently earlier than the effective U.S. filing date so that the particular month of publication is not an issue).
Bhat et al., "Improved Thermal Conductivity in Carbon Nanotubes-Reinforced Syntactic Foam Achieved by a New Dispersing Technique", JOM, vol. 67, No. 12, 2015. (The year of publication is sufficiently earlier than the effective U.S. filing date so that the particular month of publication is not an issue).
Dong et al., "Visualization of the Foaming Mechanism of Polyethylene Blown by Chemical Blowing Agents under Ambient Pressure", Advances in Polymer Technology, vol. 26, No. 4, 213-222 (2007). (The year of publication is sufficiently earlier than the effective U.S. filing date so that the particular month of publication is not an issue).
Ellson et al., "Tunable thiol-epoxy shape memory polymer foams", Smart Mater. Struct. 24 (2015) 055001 (11 pp). (The year of publication is sufficiently earlier than the effective U.S. filing date so that the particular month of publication is not an issue).
Frisch, "History of Science and Technology of Polymeric Foams", J. Macromol. Sci.-Chem., A15(6), pp. 1089-1112 (1981). (The year of publication is sufficiently earlier than the effective U.S. filing date so that the particular month of publication is not an issue).
Gojny et al., "Influence of different carbon nanotubes on the mechanical properties of epoxy matrix composites—A comparative study", Composites Science and Technology 65 (Jun. 16, 2005) 2300-2313.
Gu et al., "Development and characterization of flexible epoxy foam with reactive liquid rubber and starch", J Master Sci (Jan. 14, 2014) 49:3125-3134.
Gungor et al., "Indentation damage detection in glass/epoxy composite laminates with electrically tailored conductive hanofiller", Journal of Intelligent Material Systems and Structures 2016, vol. 27(5) 679-688. (The year of publication is sufficiently earlier than the effective U.S. filing date so that the particular month of publication is not an issue).
Gupta et al., "Studies on compressive failure features in syntactic foam material", Journal of Materials Science 36 (2001) 4485-4491. (The year of publication is sufficiently earlier than the effective U.S. filing date so that the particular month of publication is not an issue).
Wu et al., "Preparation and Characterization of Three Phase Epoxy Syntactic Foam Filled With Carbon Fiber Reinforced Hollow Epoxy Macrospheres and Hollow Glass Microspheres", Polymer Composites 2016, 497-502.
Zegeye et al., "Mechanical properties of graphene platelets reinforced syntactic foams", Composites: Part B 60 (Jan. 2, 2014) 268-273.
Zhao et al., "Rheology, Morphology, and Mechanical Properties of HMSPP/POE Blends and its Alternate Layered Foam", J. Appl Polym. Sci., 2015. (The year of publication is sufficiently earlier than the effective U.S. filing date so that the particular month of publication is not an issue).
Zhou et al., "Characterization of Aluminum Honeycomb Material Failure in Large Deformation Compression, Shear, and Tearing", Journal of Engineering Materials and Technology, Oct. 2002, vol. 124, 412-420.
Zhou et al., "Damange Characteristics of Composite Honeycomb Sandwich Panels in Bending under Quasi-static Loading", Journal of Sandwich Structures and Materials, vol. 8, Jan. 2006.
Zhou et al., "Fabrication of functionally graded porous polymer via supercritical CO2 foaming", Composites: Part B 42 (2011) 318-325. (The year of publication is sufficiently earlier than the effective U.S. filing date so that the particular month of publication is not an issue).
Gupta et al., "Enhancement of energy absorption characteristics of hollow glass particle filled composites by rubber addition", Materials Science and Engineering A 375 (2005) 233-240. (The year of publication is sufficiently earlier than the effective U.S. filing date so that the particular month of publication is not an issue).
Gupta, "A functionally graded syntactic foam material for high energy absorption under compression", Materials Letters 61 (2007) 979-982. (The year of publication is sufficiently earlier than the effective U.S. filing date so that the particular month of publication is not an issue).
Huang et al., "Thermomechanical Behavior of a Polyurethane Shape Memory Polymer Foam", Journal of Intelligent Material Systems and Structures, vol. 17—Aug./Sep. 2006, 753-760.
Jimenez et al., "Composites of Carbon Nanofibers and Thermoplastic Polyurethanes With Shape-Memory Properties Prepared by Chaotic Mixing", Polymer Engineering and Science 2009, 2020-2030. (The year of publication is sufficiently earlier than the effective U.S. filing date so that the particular month of publication is not an issue).
Kalita et al., "Hyperbranched polyurethane/Fe3O4 thermosetting nanocomposites as shape memory materials", Polym. Bull. (2013) 70:2953-2965. (The year of publication is sufficiently earlier than the effective U.S. filing date so that the particular month of publication is not an issue).
Kang et al., "Carbon nanotube reinforced shape memory polyurethane foam", Polym. Bull. (2013) 70:885-893. (The year of publication is sufficiently earlier than the effective U.S. filing date so that the particular month of publication is not an issue).
Kern et al., "Mechanical behavior of microcellular, natural fiber reinforced composites at various strain rates and temperatues", Polymer Testing 37 (2014) 148-155. (The year of publication is sufficiently earlier than the effective U.S. filing date so that the particular month of publication is not an issue).
Kim et al., "Manufacturing and-failure mechanisms of syntactic foam under compression", Composites: Part A 35 (2004) 1009-1015. (The year of publication is sufficiently earlier than the effective U.S. filing date so that the particular month of publication is not an issue).
Lee et al., "The effect of strain-hardening on the morphology and mechanical and dielectric properties of multi-layered PP foam/PP film", Polymer 70 (Jun. 18, 2015) 173-182.
Li et al., "Morphologies and electromagnetic interference shielding performances of microcellular epoxy/multi-wall carbon nanotube nanocomposite foams", Composites Science and Technology 129 (Apr. 13, 2016) 70-78.
Ohki et al., "Mechanical and shape memory behavior of composites with shape memory polymer", Composites: Part A 35 (Mar. 1, 2004) 1065-1073.
Pickering, "Recycling technologies for thermoset composite materials—current status", Composites: Part A 37 (2006) 1206-1215. (The year of publication is sufficiently earlier than the effective U.S. filing date so that the particular month of publication is not an issue).
Quadrini et al., "Shape memory epoxy foams for space applications", Materials Letters 69 (2012) 20-23. (The year of publication is sufficiently earlier than the effective U.S. filing date so that the particular month of publication is not an issue).
Ren et al., "Development of Epoxy Foaming with CO2 as Latent Blowing Agent and Principle in Selection of Amine Curing Agent", Ind. Eng. Chem. Res. 2015, 54, 11056-11064.
Serban et al., "Evaluation of the mechanical and morphological properties of long fibre reinforced polyurethane rigid foams", Polymer Testing 49 (2016) 121-127. (The year of publication is sufficiently earlier than the effective U.S. filing date so that the particular month of publication is not an issue).
Sharifishourabi et al., "Flexural Behavior of Functionally Graded Slender Beams with Complex Cross-Section", Journal of Mechanics of Materials and Structures, vol. 10, No. 1, Jan. 2015.
Shuaib et al., "Energy demand in mechanical recycling of glass fibre reinforced thermoset plastic composites", Journal of Cleaner Production 120 (Feb. 3, 2016) 198-206.
Singhal et al., "Ultra Low Density and Highly Crosslinked Biocompatible Shape Memory Polyurethane Foams", Journal of Polymer Science Part B: Polymer Physics (Mar. 4, 2012), 50, 724-737.
Thomason et al., "Regenerating the strenght of thermally recycled glass fibres using hot sodium hydroxide", Composites: Part A 87 (May 3, 2016) 220-227.

(56) References Cited

OTHER PUBLICATIONS

Wang et al., "Blast performance of water tank with energy absorbing support", Thin-Walled Structures 96 (Aug. 5, 2015) 1-10.

* cited by examiner

THERMOSET POROUS COMPOSITES AND METHODS THEREOF

CROSS-REFERENCE TO RELATED APPLICATIONS

The present application is a 35 USC 371 national stage entry of PCT/CA2019/051505 filed on Oct. 23, 2019 and which claims priority to U.S. application No. 62/754,775 filed on Nov. 2, 2018. These documents are hereby incorporated by reference in their entirety.

FIELD

The present disclosure relates to thermoset porous polymer composites and provides methods thereof and more particularly to porous composites with a density ranging from 90 kg/m$^3$ to 900 kg/m$^3$.

BACKGROUND

Porous polymer composites, with and without particles, are increasingly being used in various fields because of their important characteristics such as large surface area and unique mechanical, electrical and thermal properties. Among them, epoxy-based foams, due to their outstanding properties such as high energy absorption capability, low moisture absorption, good thermal and chemical resistance, excellent adhesion, high rigidity and shape memory effect, have found a broad range of applications in industries such as automotive, aerospace, electronics and marine. Research on developing epoxy foams started in the 1940s, and different epoxy foams, using blowing agents or/and hollow particles, have been successfully developed so far.

Generally, epoxy foams are divided into two main categories based on their processing method and the method used to introduce the porosity: blowing agents or rigid hollow particles (syntactic foams). Blowing agents can be classified into physical or chemical agents based on their mechanisms. They release gases in the matrix prior to curing resulting in a cellular structure. Nitrogen ($N_2$) and carbon dioxide ($CO_2$) are good candidates as physical blowing agents due to their broad availability, as well as limited health and safety hazard. They can be produced during a chemical reaction (thermal decomposition) of additives prior to curing or can be directly added. Chemical blowing agents are still very common as the direct use of $CO_2$ and $N_2$ is very challenging (gas loss) because, under normal conditions, they are in the gas state which makes their handling difficult and requires optimized conditions like temperature and pressure. Syntactic foams is a class of composite materials produced by filling a matrix with hollow particles like glass microspheres (cenospheres). Although syntactic foams have attracted a great deal of attention due to their higher compressive strength and higher energy absorption capability compared to other closed cell porous materials, they are not well suited to produce low density foams.

The density of epoxy foam can be decreased by increasing the pore size and pore density (general porosity) in the matrix, for example by using a higher amount of blowing agent. On the other hand, adding fillers in the matrix can improve the mechanical, thermal and electrical properties.

But processing of epoxy foams is very complex and in the presence of fillers it becomes even more difficult because these particles increase the viscosity of the resin/hardener mixture (more difficult to get homogeneous dispersion) as well as substantially accelerate the reaction rate. A reaction too fast prevents the development of the desired porous structure, while without fillers less desirable physical properties are obtained. In excess, they negatively affect the size and shape of the pores, preventing a proper development of the voids and also decreasing the mechanical properties. Therefore, the amount of fillers should be optimized to achieve a desired porous structure. The amount of blowing agent, pressure, temperature and viscosity of the mixture during curing, are other important parameters to be controlled to avoid rapid/over expansion of the foaming product causing the composite to have weak cell walls. An excessive amount of blowing agent causes the cell boundaries to coalesce resulting in the production of few very large cells leading to a poor foam structure (inhomogeneous) with low strength.

SUMMARY

According to an aspect of the present disclosure, there is provided a method of producing a thermoset porous polymer composite, comprising
preparing a mixture comprising a resin, optionally a curing agent, optionally a filler, and dry ice;
optionally casting the mixture;
curing the mixture to obtain the porous composite; and
optionally controlling at least one of a reaction rate and an expansion rate of the mixture during the curing.

According to another aspect herein described, there is provided a method of producing a thermoset porous polymer composite, comprising:
preparing a mixture comprising a resin, optionally a curing agent, optionally a filler, and dry ice;
optionally casting the mixture;
curing the mixture to obtain the porous composite; and
optionally controlling at least one of amount of dry ice, time of exposure to dry ice, pressure of the mixture, temperature of the mixture, viscosity of the mixture during the curing.

Yet another aspect described herein is a method of producing a density-graded porous polymer composite, comprising:
preparing a mixture comprising a resin, a curing agent, dry ice and optionally a filler;
casting the mixture;
curing the casted mixture to obtain the porous composite; and
controlling the reaction rate of the casted mixture to obtain a density gradient in the porous composite.

In a further aspect, there is provided a method of producing a density-graded porous polymer composite, comprising:
preparing a mixture comprising a resin, a curing agent, dry ice and optionally a filler;
forming a first polymer composite layer having a first average density and/or a first average pore size; and
varying one or more parameters to obtain a second polymer composite layer having a second average density and/or a second average pore size,
wherein the parameters are chosen from amount of dry ice, time of exposure to dry ice, pressure of the mixture, temperature of the mixture, and viscosity of the mixture;
and wherein the first and second polymer composite layers are formed by a single unitary continuous material.

Another aspect herein disclosed is a method of producing an integrated sandwich structure, comprising:

preparing a mixture comprising a resin, a curing agent, dry ice and optionally a filler;

casting the mixture;

curing the casted mixture to obtain the porous composite; and controlling the reaction rate of the casted mixture, wherein the sandwich structure comprises two external skins, a porous core and two gradual transition regions, a first gradual transition region being located between a first external skin and the porous core, and a second gradual transition region being located between a second external skin and the porous core, and wherein the two external skins, the porous core and the two gradual transition regions are formed by a single unitary continuous material.

Also provided is a method of recycling thermoset wastes according to the methods disclosed herein, wherein the polymer obtained by recycling and/or reusing a thermoset polymer waste.

In a further aspect, there is provided a density-graded thermoset porous polymer composite comprising at least two integrally connected layers having different average pore sizes and/or average densities, the polymer composite being formed by a single unitary continuous material.

In yet another aspect, there is provided an integrated sandwich polymer composite, comprising:

two external skins, a porous core, and two gradual transition regions, a first gradual transition region being located between a first external skin and the porous core, and a second gradual transition region being located between a second external skin and the porous core, wherein the two external skins, the porous core and the two gradual transition regions are formed by a single unitary continuous material.

Yet another aspect provided herein relates to a thermoset porous polymer composite having an average density of about 90 kg/m$^3$ to 900 kg/m$^3$.

BRIEF DESCRIPTION OF THE DRAWINGS

In the following drawings, which represent by way of example only, various embodiments of the disclosure.

DETAILED DESCRIPTION

Figure 1:
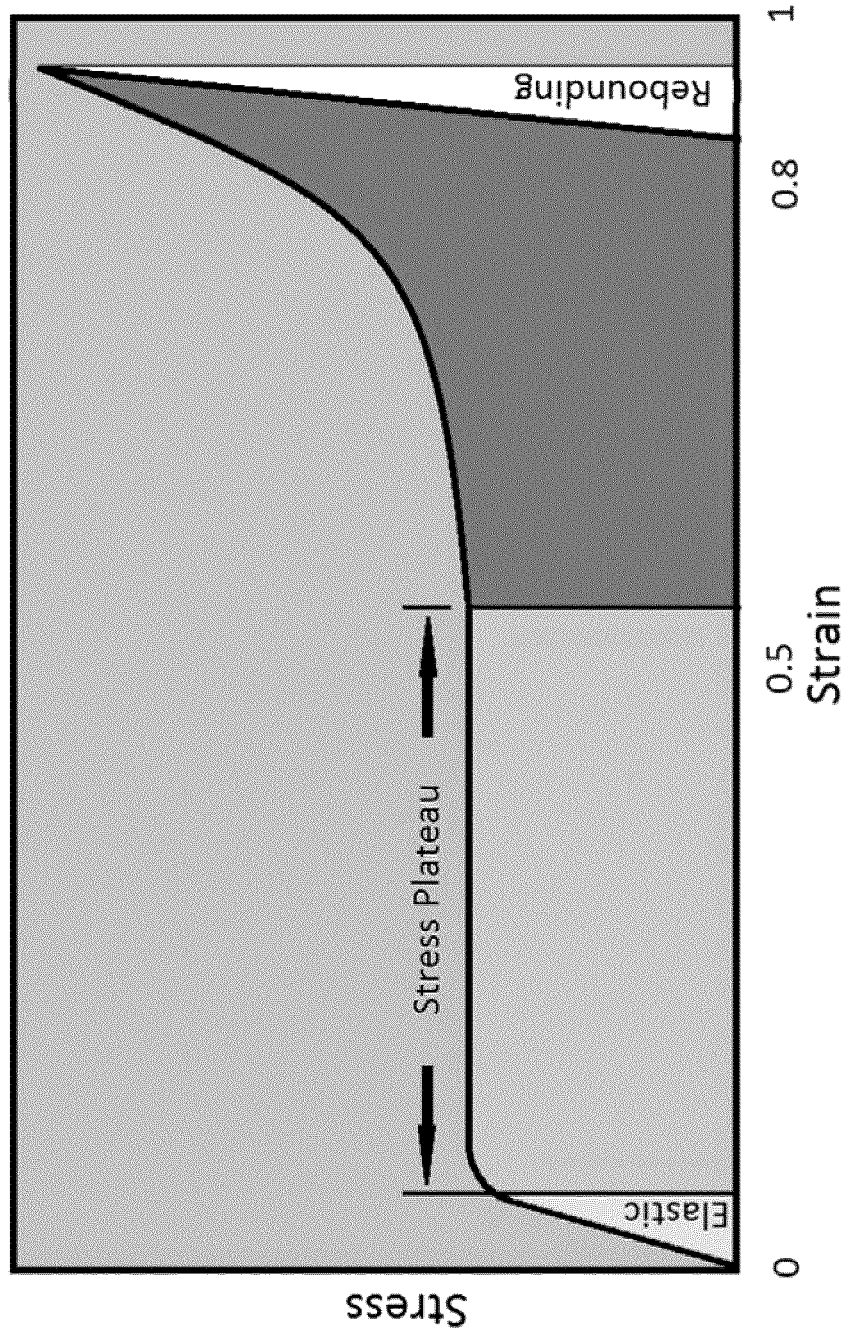
FIG. 1 is a graph illustrating a typical compressive stress-strain curve of a low density foam.

Unless otherwise indicated, the definitions and examples described herein are intended to be applicable to all embodiments and aspects of the present disclosure herein described for which they are suitable as would be understood by a person skilled in the art.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

As used herein, the term "about" means a reasonable amount of deviation of the modified term such that the end result is not significantly changed. This term of degree should be construed as including a deviation of at least ±5% or at least ±10% of the modified term if this deviation would not negate the meaning of the word it modifies.

The term "% wt." or "wt. %" as used herein when describing an ingredient present in a mixture or composite, refers to the weight % of this ingredient based on the total weight of the mixture or composite.

It is provided herein foamed-in-place methods which enable foam filling of different cavities and production of thermoset composites having voids with different shapes and sizes, ranging for example from less than 1 mm to over 1 cm in average pore size. This is achieved in part by using dry ice (solid $CO_2$) as a cure retardant and blowing agent, to disperse a high number of gas bubbles into a reactive mixture such as for example a thermosetting resin, hardener and filler, at a decisive moment, and to control the reaction rate during curing.

Dry ice is added to saturate the resin mixture with $CO_2$, acting as a physical blowing agent. Any excessive amount of dry ice will not dissolve in the polymer but rather will be evaporated without negative effect on the form. It will be understood that the minimum amount of required dry ice may vary according to different parameters such as temperature, pressure, time, as well as the fillers included which may have an effect on $CO_2$ solubility. For example, as referred to in the examples, 4% wt. dry ice is required to saturate the polymer. The mass fraction of the $CO_2$ in the final products however is less than 4% wt. Additives, such as for example ionic surfactants, may be used to increase the solubility of $CO_2$ in the polymer, thus reduce the required amount of dry ice.

Dry ice is used not only as a physical blowing agent, but may also be used to control the reaction rate (e.g. to control the crosslinking reaction through temperature control), thus providing density grading and/or integral skin forming. Again, it will be understood that the required amount of dry ice varies according to materials and process conditions, as described above.

For example, the mixture further comprises a curing agent.

For example, the mixture further comprises a filler.

For example, the method further comprises casting the mixture.

For example, the method further comprises controlling the reaction rate of the mixture during the curing.

For example, the method further comprises controlling the expansion rate of the mixture curing the curing.

For example, the method further comprises controlling at least one of amount of dry ice, time of exposure to dry ice, pressure of the mixture, temperature of the mixture, viscosity of the mixture during the curing.

For example, the preparing the mixture comprises preheating the resin or portion thereof prior to mixing with the curing agent.

For example, the preparing the mixture comprises preheating the curing agent or portion thereof to mixing with the resin.

For example, the preparing the mixture comprises mixing together the resin or portion thereof and the curing agent or portion thereof prior to mixing with the dry ice.

For example, the preparing the mixture comprises mixing together the resin or portion thereof and the curing agent or portion thereof, and preheating the mixed resin or portion thereof and curing agent or portion thereof prior to mixing with the dry ice.

For example, the preparing the mixture comprises mixing the filler with the resin or portion thereof.

For example, the preparing the mixture comprises mixing the filler with the curing agent or portion thereof.

For example, the preparing the mixture comprises mixing together the resin, the curing agent, the dry ice and the filler.

A person skilled in the art will understand that any thermosetting resin may be used. For example, the resin is chosen from epoxy, silicone, polyurethane, polyester, vinylester, phenol formaldehyde (bakelite), urea-formaldehyde and vulcanized rubber.

For example, the resin is epoxy.

For example, the epoxy is epoxy 335 or Epicote 1006.

For example, the curing agent is chosen from an anionic catalyst, a cationic catalyst, a photo catalyst, an ultra-violet catalyst, amines, optionally alkyl ether amine, anhydrides, phenols, thiols, platinum compounds isocyanates, acids, polyamides and any functional group allowing the reaction to take place, and mixtures thereof.

A person skilled in the art will understand that a filler may include, without limitation, syntactic and/or natural modifying/reinforcing particles/fibers, for example nano modifying/reinforcing particles/fibers or micro modifying/reinforcing particles/fibers, such as carbon, glass, Kevlar, metal and cellulose.

For example, the filler is chosen from carbon fibers, carbon nanotubes, syntactic fibers and natural fibers.

For example, the carbon nanotubes are single-walled carbon nanotubes or multi-walled carbon nanotubes.

For example, the syntactic fibers are chosen from glass and Kevlar.

For example, the natural fibers are chosen from cellulose and metal.

For example, the cellulose is wood.

For example, the mixture comprises about less than 1% wt. to about 10% wt. of the dry ice.

For example, the mixture comprises about 1% wt. to about 8% wt. of the dry ice.

For example, the mixture comprises about 2% wt. to about 6% wt. of the dry ice.

For example, the mixture comprises about 3% wt. to about 5% wt. of the dry ice.

For example, the mixture comprises about at least 4% wt. of the dry ice.

For example, the mixture comprises about less than 1% wt. to about 30% wt. of the filler.

For example, the mixture comprises about 1% wt. to about 20% wt. of the filler.

For example, the mixture comprises about 1% wt. to about 15% wt. of the filler.

For example, the mixture comprises about 1% wt. to about 10% wt. of the filler.

For example, the mixture comprises about 1% wt. to about 5% wt. of the filler.

For example, the mixture comprises about 1% wt. to about 4% wt. of the filler.

For example, the mixture comprises about 1% wt. to about 3% wt. of the filler.

For example, the mixture comprises about 1% wt. to about 2% wt. of the filler.

For example, the mixture further comprises a foaming agent.

For example, the foaming agent is a chemical foaming agent.

For example, the chemical foaming agent is sodium bicarbonate reacted with water, an additive increasing solubility of $CO_2$, a catalyst, an accelerator, an inhibitor, a surfactant.

For example, the surfactant is triton.

For example, the reaction rate is decreased by lowering temperature of the mixture or portion thereof.

For example, the temperature is decreased by contacting the mixture or portion thereof with dry ice, with a liquid at a temperature of 30° C. or less or with air at a temperature of 30° C. or less.

For example, the temperature is decreased by contacting the mixture or portion thereof with dry ice.

For example, the temperature is decreased by contacting the mixture or portion thereof with about 0.1% wt. to about 5% wt. of dry ice.

For example, the temperature is decreased by contacting the mixture or portion thereof with about 0.5% wt. of dry ice.

For example, the reaction rate is increased by increasing temperature of the mixture or portion thereof.

For example, the expansion rate is decreased by increasing pressure of the mixture.

For example, the expansion rate is increased by decreasing pressure of or applying a vacuum to the mixture.

For example, the mixture is pressurized prior to curing.

For example, the mixture is pressurized during curing.

For example, the mixture is vacuumed prior to curing.

For example, the mixture is vacuumed during curing.

For example, the method further comprises post-curing the porous composite.

For example, the porous composite has an average density ranging from about 90 kg/m$^3$ to about 900 kg/m$^3$.

For example, the porous composite has an average density ranging from about 90 kg/m$^3$ to about 600 kg/m$^3$.

For example, the porous composite has an average density ranging from about 90 kg/m$^3$ to about 300 kg/m$^3$.

For example, the porous composite has an average density ranging from about 90 kg/m$^3$ to about 250 kg/m$^3$.

For example, the porous composite has an average density ranging from about 90 kg/m$^3$ to about 200 kg/m$^3$.

For example, the porous composite has an average density ranging from about 90 kg/m$^3$ to about 180 kg/m$^3$.

For example, the porous composite has an average density ranging from about 90 kg/m$^3$ to about 160 kg/m$^3$.

For example, the porous composite has an average density ranging from about 90 kg/m$^3$ to about 150 kg/m$^3$.

For example, the porous composite has an average density ranging from about 90 kg/m³ to about 140 kg/m³.

For example, the porous composite has an average pore size between about 0.1 μm to about 10 mm.

For example, the porous composite has an average pore size between about 0.1 mm to about 5 mm.

For example, the porous composite has an average pore size between about 0.1 mm to about 3 mm.

For example, the porous composite has an average pore size between about 0.1 mm to about 2 mm.

For example, the porous composite has an average pore size between about 0.1 mm to about 1 mm.

For example, the porous composite has an average pore size between about 0.1 μm to about 1 mm.

For example, the porous composite has an average pore size between about 0.1 μm to about 500 μm.

For example, the porous composite has an average pore size between about 0.1 μm to about 400 μm.

For example, the porous composite has an average pore size between about 0.1 μm to about 300 μm.

For example, the porous composite has an average pore size between about 0.1 μm to about 200 μm.

For example, the porous composite has an average pore size between about 0.1 μm to about 100 μm.

It will be understood that the average pore sizes are dependent various parameters such as mixture compositions (which may have different rheological behaviors), processing conditions, as well as viscosity of the mixture, interactions between mixture constituents, temperature, time and pressure during curing. All of the foregoing parameters also affect the resulting average density, wall thickness and interpore distance of the polymer composite.

For example, the porous composite is made of a unitary continuous material.

For example, the porous composite has a compressive strength of about less than 1 MPa to about 100 MPa.

For example, the porous composite has a compressive strength of about 0.4 MPa to about 40 MPa.

For example, the porous composite has a compressive strength of about 0.1 MPa to about 15 MPa.

For example, the porous composite can withstand at least 2 MPa of compressive stress for at least 30% strain, at least 35% strain, at least 40% strain, at least 45% strain, at least 50% strain or at least 55% strain.

For example, the porous composite can withstand at least 3 MPa of compressive stress for at least 30% strain, at least 35% strain, at least 40% strain, at least 45% strain, at least 50% strain or at least 55% strain.

For example, the porous composite can withstand at least 4 MPa of compressive stress for at least 30% strain, at least 35% strain, at least 40% strain, at least 45% strain, at least 50% strain or at least 55% strain.

For example, the porous composite comprises at least two integrally connected layers having different average densities.

For example, the porous composite comprises at least two integrally connected layers having different average pore sizes.

For example, the porous composite comprises three integrally connected layers having different average densities.

For example, the porous composite comprises three integrally connected layers having different average pore sizes.

For example, the two outer layers of the porous composite have an average density greater than that of the middle layer of the porous composite.

For example, the two outer layers of the porous composite have an average density smaller than that of the middle layer of the porous composite.

For example, the two outer layers of the porous composite have an average pore size smaller than that of the middle layer of the porous composite.

For example, the two outer layers of the porous composite have an average pore size larger than that of the middle layer of the porous composite.

For example, the porous composite is density-graded therethrough.

For example, the porous composite is an integrated sandwich structure.

For example, the integrated sandwich structure comprises:
two external skins,
a porous core, and
two gradual transition regions, a first gradual transition region being located between a first external skin and the porous core, and a second gradual transition region being located between a second external skin and the porous core,
wherein the two external skins, the porous core and the two gradual transition regions are formed by a single unitary continuous material.

For example, the two external skins are located at opposing ends of the integrated sandwich structure.

For example, the two external skins are substantially parallel to one another.

For example, the controlling the reaction rate of the casted mixture comprises decreasing the reaction rate of a portion of the casted mixture.

For example, the decreasing the reaction rate comprises exposing a portion of the casted mixture to a decreased temperature so as to generate a density gradient in the porous composite, the portion of the casted mixture exposed to the decreased temperature having a smaller pore size compared to a portion of the casted mixture not exposed to the decreased temperature.

For example, the density-graded porous polymer composite comprises at least two integrally connected layers having different average pore sizes and/or average densities.

For example, the controlling the reaction rate of the casted mixture comprises decreasing the reaction rate of two opposing outer layers of the casted mixture so as to form the external skins and gradual transition regions.

For example, the decreasing the reaction comprises exposing the opposing outer top and bottom portions of the casted mixture to a decreased temperature.

In one embodiment, there is described herein a method of producing a thermoset porous polymer composite, comprising:
preparing a mixture comprising a resin, a hardener, filler, and dry ice;
adding additional dry ice to the mixture;
casting the mixture;
curing the mixture to obtain the porous composite; and
increasing the temperature of the mixture after casting to increase the reaction rate.

In another embodiment, there is provided a method of producing an integrated sandwich structure having two external skins, a porous core and two gradual transition regions, a first gradual transition region being located between a first external skin and the porous core, and a second gradual transition region being located between a second external skin and the porous core, the method comprising:

preparing a mixture comprising a resin, a hardener, filler, and dry ice;

casting the mixture;

curing the mixture to obtain the porous composite;

increasing the temperature of the mixture after casting to increase the reaction rate; and exposing opposing top and bottom portions of the casted mixture to a decreased temperature so as to form the two external skins and the two gradual transition regions.

In a further embodiment, there is described a method of producing a density-graded porous polymer composite, comprising:

preparing a mixture comprising a resin, a curing agent, dry ice and optionally a filler;

adding additional dry ice to the mixture;

casting the mixture;

curing the mixture to obtain the porous composite;

increasing the temperature of the mixture after casting to increase the reaction rate; and exposing a portion of the casted mixture to a decreased temperature so as to form a density gradient in the polymer composite.

In yet another embodiment, there is described a method of producing a layered porous polymer composite, comprising:

preparing a mixture comprising a resin, a curing agent, dry ice and optionally a filler;

adding additional dry ice to the mixture;

casting the mixture;

curing the mixture to obtain the porous composite; and exposing top and bottom portions of the casted mixture to a decreased temperature so as to form density gradients in the polymer composite.

For example, the methods disclosed herein are a one-step method.

In still another embodiment, there is provided a density-graded thermoset porous polymer composite comprising at least two integrally connected layers having different average pore sizes and/or average densities, the polymer composite being formed by a single unitary continuous material.

For example, the two integrally connected regions are substantially parallel with respect to one another.

For example, the two external skins are located at opposing ends of the integrated sandwich structure.

For example, the two external skins are substantially parallel to one another.

For example, the polymer composite has a density of about 90 kg/m$^3$ to 600 kg/m$^3$.

For example, the polymer composite has a density of about 90 kg/m$^3$ to 300 kg/m$^3$.

For example, the polymer composite has a density of about 90 kg/m$^3$ to 250 kg/m$^3$.

For example, the polymer composite has a density of about 90 kg/m$^3$ to 200 kg/m$^3$.

For example, the polymer composite has a density of about 90 kg/m$^3$ to 180 kg/m$^3$.

For example, the polymer composite has a density of about 90 kg/m$^3$ to 160 kg/m$^3$.

For example, the polymer composite has a density of about 90 kg/m$^3$ to 150 kg/m$^3$.

For example, the polymer composite has a density of about 90 kg/m$^3$ to 140 kg/m$^3$.

For example, the polymer composite has an average pore size between about 0.1 µm to about 10 mm.

For example, the polymer composite has an average pore size between about 0.1 mm to about 5 mm.

For example, the polymer composite has an average pore size between about 0.1 mm to about 3 mm.

For example, the polymer composite has an average pore size between about 0.1 mm to about 2 mm.

For example, the polymer composite has an average pore size between about 0.1 mm to about 1 mm.

For example, the polymer composite has an average pore size between about 0.1 µm to about 1 mm.

For example, the polymer composite has an average pore size between about 0.1 µm to about 500 µm.

For example, the polymer composite has an average pore size between about 0.1 µm to about 400 µm.

For example, the polymer composite has an average pore size between about 0.1 µm to about 300 µm.

For example, the polymer composite has an average pore size between about 0.1 µm to about 200 µm.

For example, the polymer composite has an average pore size between about 0.1 µm to about 100 µm.

For example, the polymer composite has a compressive strength of about less than 1 MPa to about 100 MPa.

For example, the polymer composite has a compressive strength of about 0.4 MPa to about 40 MPa.

For example, the polymer composite has a compressive strength of about 0.1 MPa to about 15 MPa.

For example, the composite can withstand at least 2 MPa of compressive stress for at least 30% strain, at least 35% strain, at least 40% strain, at least 45% strain, at least 50% strain or at least 55% strain.

For example, the composite can withstand at least 3 MPa of compressive stress for at least 30% strain, at least 35% strain, at least 40% strain, at least 45% strain, at least 50% strain or at least 55% strain.

For example, the composite can withstand at least 4 MPa of compressive stress for at least 30% strain, at least 35% strain, at least 40% strain, at least 45% strain, at least 50% strain or at least 55% strain.

For example, the polymer composite is formed by a single unitary continuous material.

For example, the polymer composite herein described is for use as a sandwich structure, a crash energy absorber, a foam filling material, a self-healing material, a blast mitigating material, a flooring material, a packaging foam, a thermal insulator, a sound absorber, a anti-seismic material and/or for automotive industry applications.

In one embodiment, there is provided a thermoset porous polymer composite having an average density of about 120 kg/m$^3$ to 900 kg/m$^3$ and a compression strength of about 0.4 to about 40 MPa.

In another embodiment, there is provided a thermoset porous polymer composite having an average density of about 90 kg/m$^3$ to 500 kg/m$^3$ and a compression strength of about 0.1 to about 15 MPa.

The present disclosure provides methods for a one-step in-situ fabrication of lightweight high performance porous composites, such as epoxy-based porous composites, using $CO_2$ as a physical blowing agent which is non-toxic, stable, low-cost, non-flammable and available. Dry-ice, the solid form of $CO_2$, may be used to simultaneously blow bubbles into a polymer matrix and to control the curing process. Dry-ice is a potential source of blowing agent which allows dispersing of any desired amount of $CO_2$ into a resin (e.g. epoxy resin) at any desired moment, without leaving any residue. The presence of $CO_2$ as a cure retardant and the very low temperature of dry-ice (around −78° C.), enable controlling the reaction rate of the thermosetting resin, curing agent and optionally filler at a decisive moment, and thus producing foams having voids with different but controlled shapes and sizes, ranging for example from less than 1 mm (e.g. 0.1 µm to 100 µm) to over 1 cm in average pore size and suitable for different applications.

For example, the method herein described can comprise some or all of the following steps:
a) Providing a mixture comprising a resin (e.g. epoxy) and a curing agent (e.g. hardener(s));
b) Preheating a portion or whole of the resin (e.g. epoxy) and/or curing agent (e.g. hardener(s));
c) Preheating a portion or whole of the mixture of resin (e.g. epoxy) and curing agent (e.g. hardener(s));
d) Mixing a portion or whole of the resin (e.g. epoxy) with a portion or whole of the filler(s);
e) Mixing a portion or whole of the curing agent (e.g. hardener(s)) with a portion or whole of the filler(s);
f) Mixing a portion or whole of the mixture of resin (e.g. epoxy) and curing agent (e.g. hardener(s)) with a portion or whole of the filler(s);
g) Combining the resin (e.g. epoxy) or the mixture of resin (e.g. epoxy) and filler with curing agent (e.g. hardener(s)) or the mixture of curing agent (e.g. hardener) and filler(s);
h) Addition of solid $CO_2$ (dry-ice);
i) Casting into a cavity (mold);
j) Curing; and
k) Post-curing.

One or more of the following steps can also be applied to control the distribution, shape and/or size of the pores, and final density of the porous composites:
l) Decreasing the reaction rate by using lower temperature (cooling down);
m) Controlling the expansion ratio through application of negative (vacuum) or positive pressure; and
n) Accelerating the reaction rate by using higher temperature (heating up).

The method may be used to produce high performance thermoset porous composites for different applications, such as high energy absorption applications.

The examples detailed below are non-limitative and are used to better exemplify the methods of the present disclosure.

EXAMPLES

Example 1—Fiber Reinforced Composite Foam with High Energy Absorption Capacity

Foam materials, under compression, are able to absorb a large amount of energy by undergoing plastic deformation and localized fracture determined by the area under compressive stress-strain curves. Typically, the compressive stress-strain curve of a low density foam experiences a stress-plateau which represents its energy absorption characteristics, as shown in FIG. 1. Under the same compressive stress, materials with longer stress plateaus have higher energy absorption capacity.

Although different low density foams have been developed, lighter materials with higher strength and energy absorption capacity are required to increase the safety and efficiency of engineering systems, especially for aerospace, automotive and packaging systems. Lighter epoxy foam can be achieved by increasing the pore size and porosity in the foam, but highly porous foams, despite of their longer stress plateau region, will not always show higher energy absorption capacity. This is associated to the fact that when the porosity increases, compressive strength decreases significantly. This is why the development of lower density polymer foams with higher energy absorption capability has been challenging. Nevertheless, a great deal of effort was devoted to this objective, but limited success has been achieved to extend the stress plateau without significant loss in strength. Among the developed epoxy foams, syntactic foams (epoxy matrix embedded with hollow particle) have shown higher compressive strength and higher energy absorption capacity. However, high density syntactic epoxy foams are required to have high density to be used as a core material for sandwich structures. On the other hand, low density syntactic foams are very weak. This is related to the fact that by decreasing the density of a syntactic epoxy foam, its compressive strength, plateau stress zone and thus its energy absorption capacity drop dramatically so that a foam with a density below 150 kg/m$^3$ is weak compared to other types of epoxy foams. This shortcoming of syntactic epoxy foams has limited their application as a core material for sandwich structures. Therefore, there is a need for a superior material having lower density and showing higher strength and energy absorption capability. Rather than filling the embedding hollow particles, one possible avenue is to reinforce the foam structure with fillers and fibers as an effective way to improve the mechanical properties and energy absorption capacity. This is because in composite foams the advantages of composite and foam materials are combined, leading to improved stiffness and strength due to particle reinforcement as well as low density and large surface area created by the porous structure.

Fabrication Method of Fiber Reinforced Epoxy Foams

Figure 2:
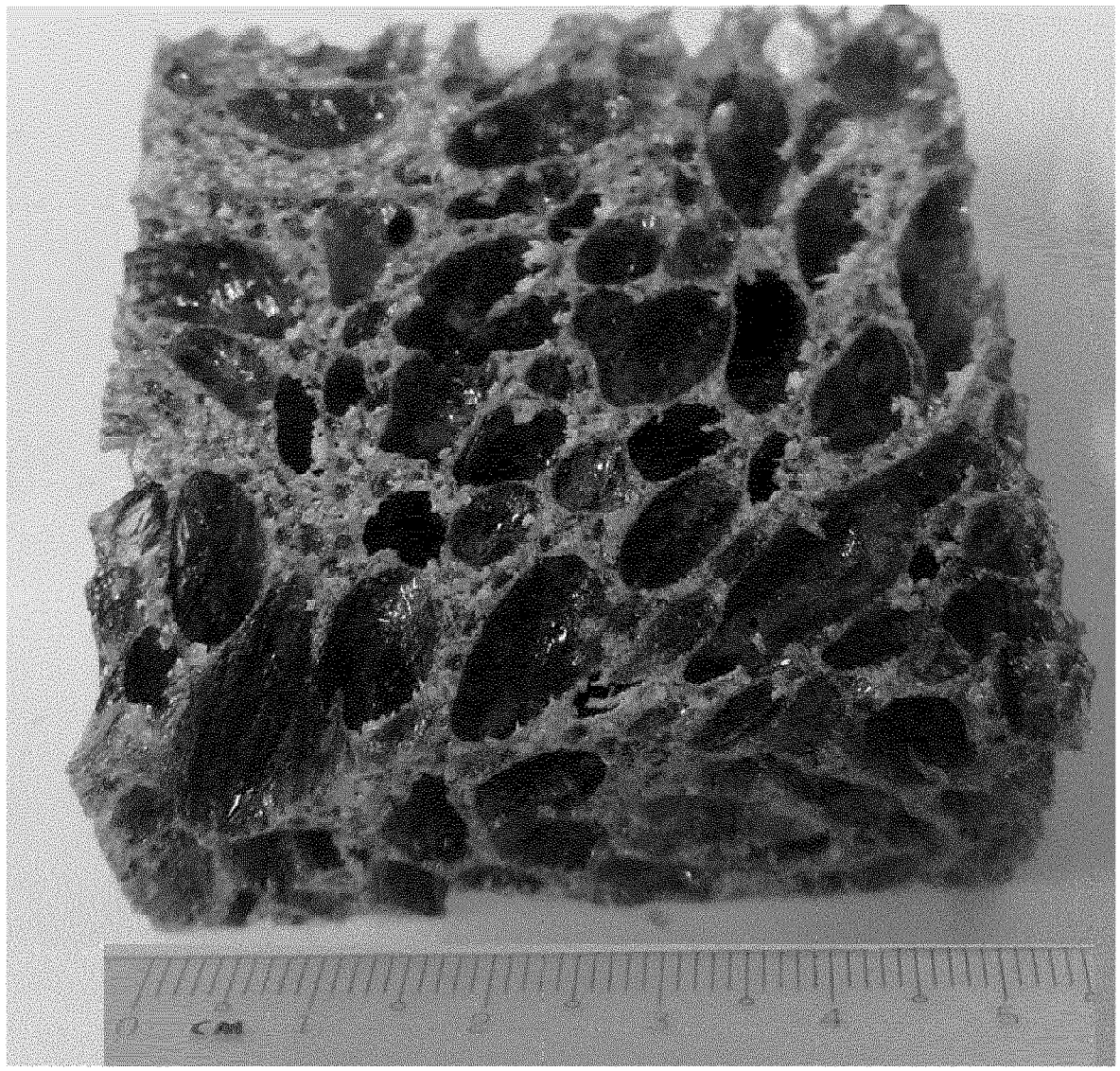
FIG. 2 is a photograph of a fiber reinforced composite foam with a density of 225 kg/m$^3$.
Figure 3:
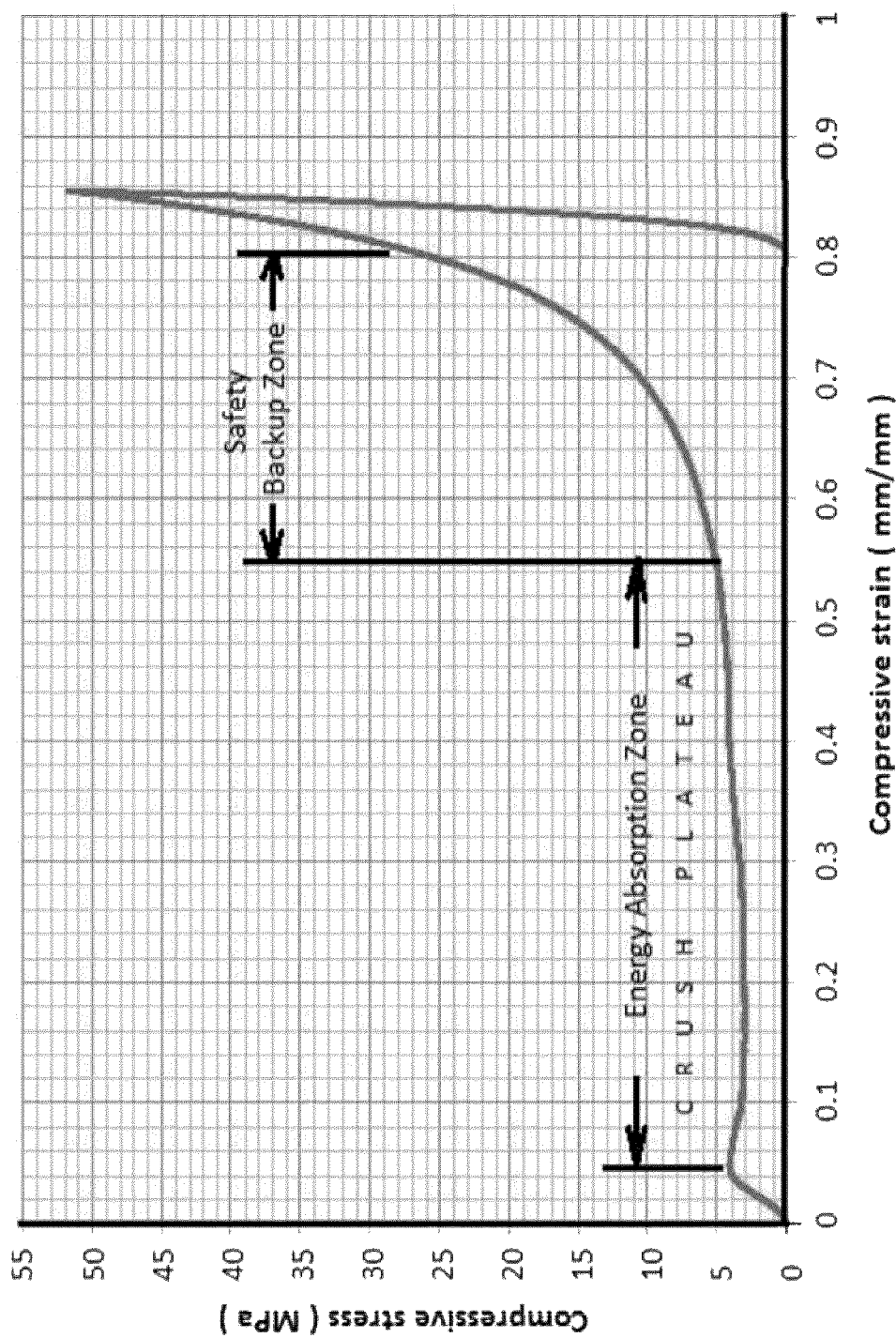
FIG. 3 is a graph showing a compressive stress-strain curve obtained from the composite foam of FIG. 2.

A fiber reinforced epoxy foam with pore size ranging from less than 1 mm to around 10 mm and a density of 225 kg/m$^3$ (FIG. 2) was produced which can withstand at least 4 MPa of compressive stresses for at least 55% strain without significant loss in strength (FIG. 3). The material was achieved by a controlled curing of an epoxy system reinforced with carbon fibers and foamed using dry-ice, through sequences of steps a, b, g, h, f, i, j, k, l, m and n. An epoxy system with high degree of hardness and mechanical properties (Epicote 1006) was selected (step a). To decrease the viscosity and to enable a better wetting of the fillers, the epoxy resin was preheated to 45° C. (step b) and combined with the hardener (polyamide) at a mixing ratio of 10:6 using a dual hand mixer (step g). The mixture was subsequently saturated with $CO_2$ through dispersion of at least 4% wt. dry-ice using a mixer (step h). Subsequently, 1.5% wt. of short carbon fibers (3-6 mm, cut from SikaWrap®-300C NW) were manually added to the mixture using a stick (step f). The mixture was then poured into a pre-waxed cavity (step i) and cured (step j). The product was then post-cured to complete the polymerization process (step k).

The above process was controlled by especially applying steps l, m, and n. To elaborate, immediately after step h, 0.5% wt. dry-ice was again used for about three minutes to decrease the reaction rate (step l). The mixture composed of 150 g epoxy, its hardener and fillers was casted into a cubic container with a volume of 3375 cm$^3$ (15 cm×15 cm×15 cm). Dimensions and aspect ratio of the container have significant effect on the pressure profile and thus expansion ratio (step m). The ambient temperature was 27° C., and to accelerate the reaction, immediately after applying step i, the surface of the materials was covered with a very thin plastic film (cellophane film, 0.02 mm) which decreases the heat loss generated by the exothermic reaction of the epoxy with the hardener (step n).

Energy Absorption Performance of the Fiber Reinforced Foam

To study the energy absorption performance of the developed composite foams, compression tests were conducted at room temperature (28° C.) using an Instron universal testing machine model 5980. Five samples, with thickness of 25 mm and square area of 2500 mm², were cut from a foam block with an overall density of 225 kg/m³ and tested according to ASTM C365 (Standard Test Method for Flatwise Compressive Properties of Sandwich Cores). The average compressive stress-strain curve obtained from compression testing is shown in FIG. 3. Like for other types of energy absorbers, after elastic deformation, the curve includes an energy absorption, or crush plateau zone, followed by a safety backup zone, which represents an additional energy absorption capacity. The area under the curve represents the work done by compressing the foam block, which is equal to the stress times the strain, or the force times the displacement of the specimen. According to the principle of conservation of energy, this work is equal to the kinetic energy applied on the foam block. In the crush plateau zone, the applied kinetic energy is completely absorbed, unlike the elastic deformation zone in which energy is stored, because the foam crushes and does not experience any densification. Foam with higher crush strength and longer plateau zone lead to higher energy absorption capacity. Recently, several attempts have been made to develop a low weight epoxy foam with high compressive strength and extended stress plateau zone, but limited successes have been achieved. The presently developed foam exhibits very high compressive strength (more than 4.2 MPa) and very long stress plateau zone (up to 55% strain). This was achieved by undergoing plastic deformation and localized fracture due to its crushable cellular structure. It was able to withstand at least 4 MPa of compressive stress up to 55% strain, while its initial density was only 225 kg/m³. Even though honeycomb cores may show longer stress plateaus (more than 85%), their anisotropic/orthotropic behavior and their small safety backup zone limit their use. Honeycombs, under inclined loading where the applied load has both a vertical and a horizontal component, are very weak since they are able to withstand loads in only one direction (i.e. parallel to their cell prisms). Additionally, it is not safe to use them when the amount of applied load is not fully known, because they fully fail as soon as the applied stress exceeds the crush strength. For example, an aluminum honeycomb with a crush strength of 1.7 MPa is severely compacted and failed (more than 85%) when subjected to 2 MPa of stress, which represents a value only 18% higher than its crush strength. So, it is not safe to use this material as a blast shelter where the blast load can be considerable, for example twice the predicted amount.

From a safety point of view, the foam presented in FIG. 3 includes a large safety backup zone (25% of strain) which can still absorb a high amount of energy (up to 2.65 MJ/m³) if an unexpected stress, higher than the crush strength, is applied. As seen in FIG. 3, at the end of the crush plateau zone, the foam core is still able to absorb energy at least equal to the amount absorbed in the crush plateau zone. In the crush plateau zone, 1.82 MJ/m³ were already absorbed and the material can still absorb more; up to 2.65 MJ/m³. Therefore, by optimizing the design parameter such as compressive strength and foam thickness, a foam block may for example absorb all of the energy applied.

Figure 4A:
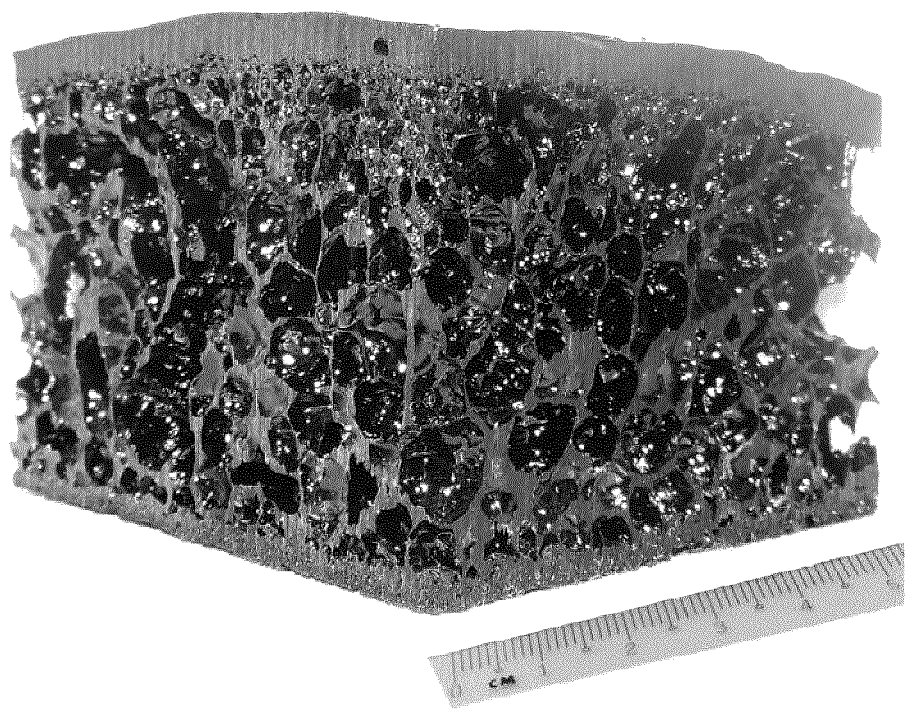
FIG. 4A is a photograph of an integrated core sandwich nanocomposite and FIG. 4B is an illustration of the integrated core sandwich nanocomposite of FIG. 4A.
Figure 4B:
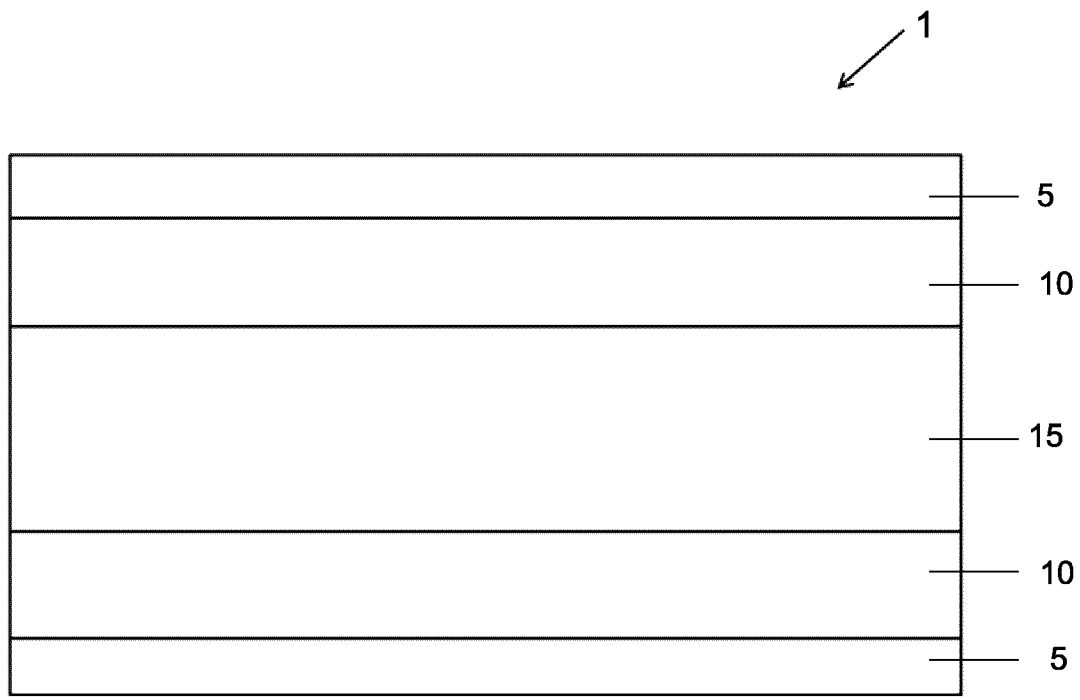

Example 2—Integrated Core Sandwich Nanocomposite with High Energy Absorption Capacity Sandwich structures are made of two thin skins enclosing a thick and lightweight core to produce higher specific strength and stiffness structures. Normally, the skins provide in-plane strength and the core carries shear loads. Polymer sandwich structures are increasingly used in automotive, naval, aerospace and building industries due to their excellent thermal properties, strength to weight ratio and high energy absorption characteristics. However, some drawbacks like manufacturing difficulties, delamination problems at the bonded interfaces and in some cases anisotropic/orthotropic behavior of the core material, especially when using honeycombs, are associated with them. To overcome these problems, an integrated sandwich structure with a high specific strength and better load bearing compared to conventional sandwich structures was developed. This sandwich nanocomposite includes two integral compact skins, a low weight foam core and Gradual Transition Regions (GTR) between the skins and core. An example of this sandwich structure is presented in the photograph of FIG. 4A and the drawing of FIG. 4B. In this structure, the composition varies gradually and continuously from one surface to the other resulting in smooth variation of mechanical and thermal properties, minimizing stress/strain discontinuities to overcome the delamination problem. Referring in particular to FIG. 4B, under compression, this sandwich nanocomposite structure 1 which comprises skins 5 on either sides provides high energy absorption capacity thanks to its integrated crushable core 15 and the GTR 10 provide safety backup increasing its resistance and allowing to absorb a significant amount of energy.

Fabrication Method of the Integrated Core Sandwich

The material was achieved by a controlled curing of a high performance thermoset resin reinforced with multiwall carbon nanotubes (FloTube™ 9000) foamed using dry ice through sequences of steps a, b, f, g, h, i, j, k, l, m and n. An epoxy system with low viscosity, high degree of hardness and mechanical properties (epoxy 335) was selected (step a). Before being used, the carbon nanotube (CNT) (2.5% wt.) were dispersed in acetone (at least 100 times of CNT weight) using ultrasonication. To decrease the viscosity and to enable a better dispersion of the fillers, the epoxy resin was preheated to 65° C. (step b). The CNT/acetone suspension was manually combined with the epoxy resin using a stick (step f) and the mixture was again subjected to ultrasonication. After removing the acetone, through degassing in a vacuum oven at 70° C., the epoxy resin was combined with the hardener (335 part B, containing alkyl ether amine) with a mixing ratio of 100:38 using a dual hand mixer (step g). The mixture was subsequently saturated with $CO_2$ through dispersion of at least 4% wt. dry-ice using a mixer (step h). The mixture was then poured into a pre-waxed cavity (step i) and cured (step j). The product was then post-cured to complete the polymerization process (step k).

To achieve the cellular structure with integral skins the above process was controlled by especially applying steps m, n, and l. The mixture composed of 200 g epoxy, its hardener and fillers was casted into a cubic container with a volume of 8000 cm³ (20 cm×20 cm×20 cm). Dimensions and aspect ratio of the mold have significant effects on the pressure profile and thus expansion ratio (step m). The ambient temperature was 23° C., and to accelerate the reaction, immediately after applying step i, the surface of the mixture was covered with a very thin plastic film which decreases heat loss generated by the exothermic reaction of the epoxy with the hardener (step n). As soon as the expansion began, the bottom of the container was placed in cold water (below 30° C.) and the temperature of top surface of the foam materials was kept below 30° C. using dry ice powder, to decrease the reaction rate at the bottom and top regions, respectively (step l), thus forming the integral skins. This step can be done by leaving the container in a cold chamber with a temperature below 30° C.

Compressive Performance of the Integrated Core Sandwich

Figure 5A:
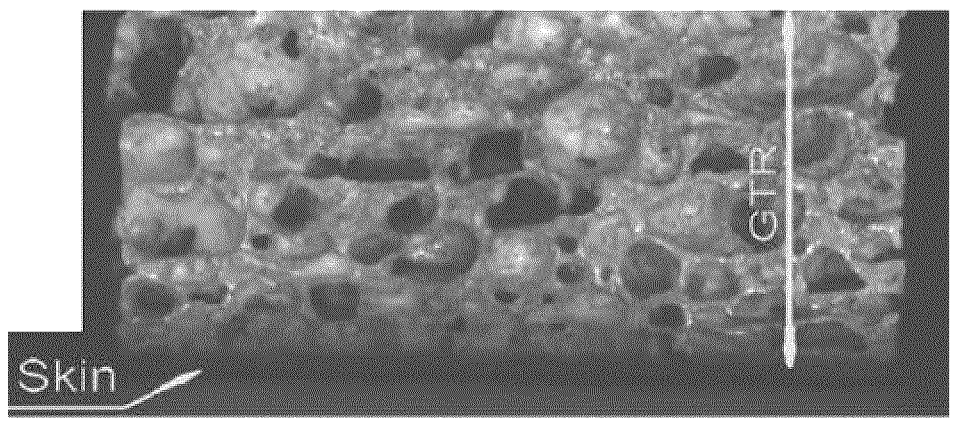
FIGS. 5A, 5B, 5C, 5D, 5E, 5F, 5G, 5H and 5I is a series of photographs showing portions of the integrated core sandwich nanocomposite of FIG. 4A under compression
Figure 5B:
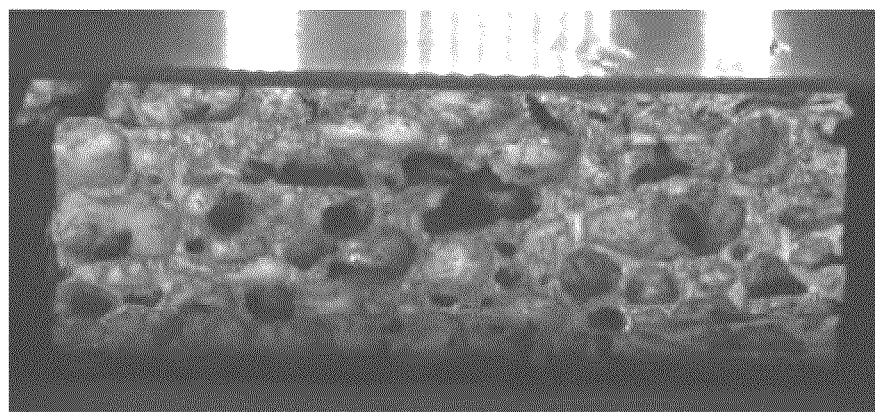
Figure 5C:
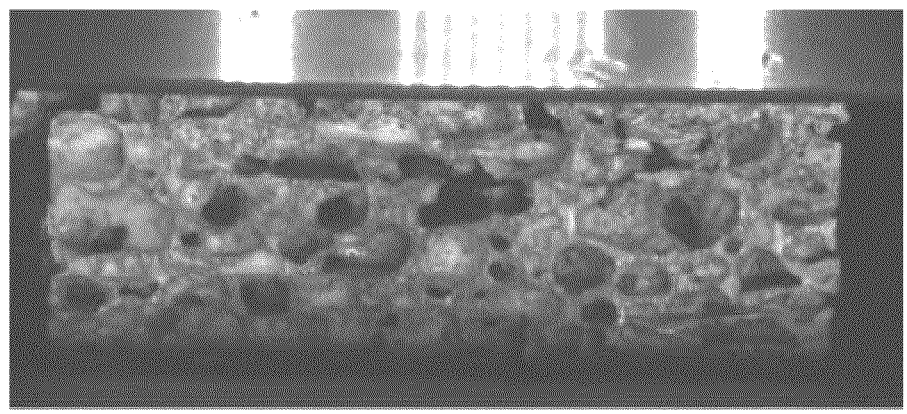
Figure 5D:
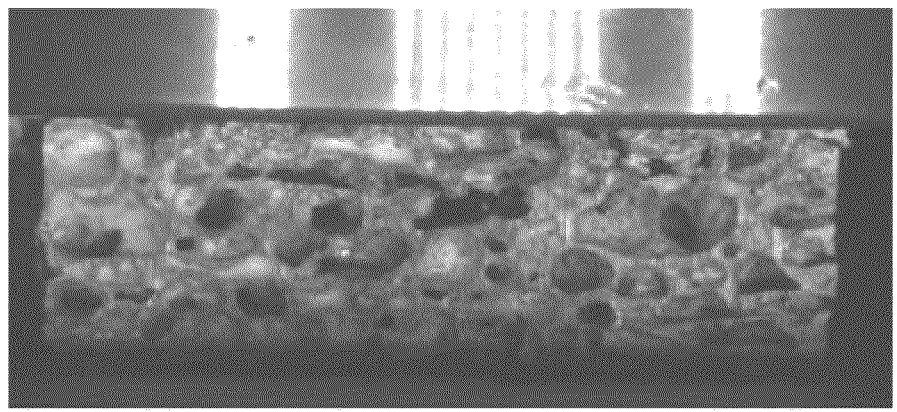

To study the quasi-static compressive performance and failure mechanism of the developed sandwich structure, compression tests were conducted at room temperature (22° C.) using an Instron universal testing machine model MTS 100 kN electromechanical load frame with 5M ARAMIS 2016 digital image correlation system. To study the failure mechanism of the produced sandwich structure, especially in the regions close to the integral skin where the cell size and thus foam density varies gradually and continuously, the test specimens, with thickness of 25 mm and square area of 2500 mm$^2$, were cut from a sandwich panel with an average density of 284 kg/m$^3$. The test specimens included a skin with thickness of about 0.2 mm and the GTR between the skin and core (see FIG. 5A). The average density of the test specimen was 296 kg/m$^3$.

Figure 5E:
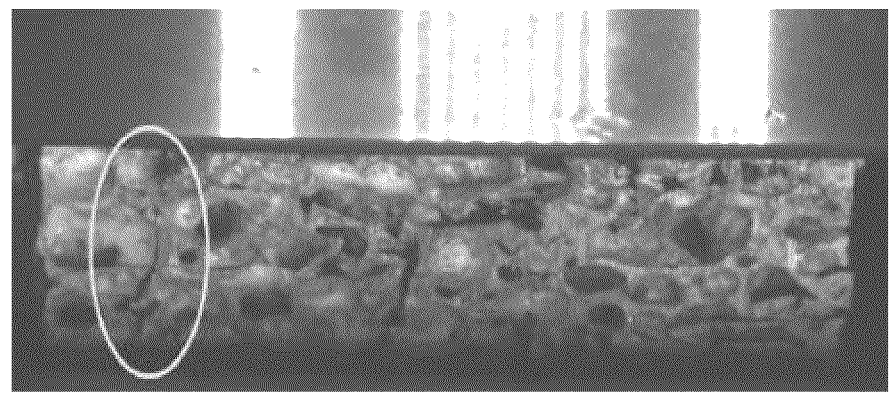
Figure 5F:
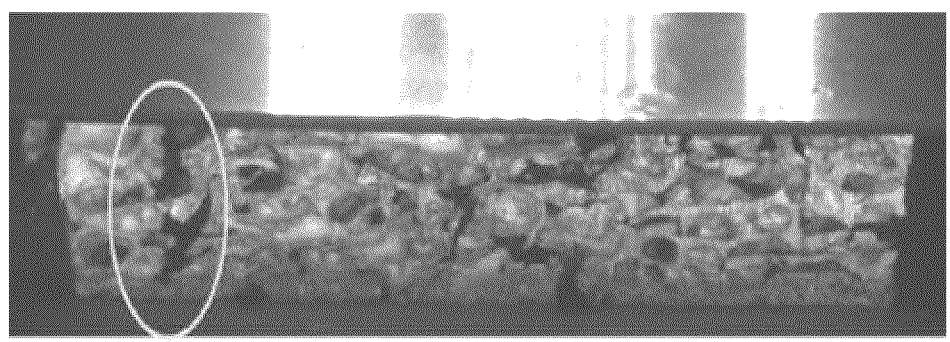
Figure 5G:
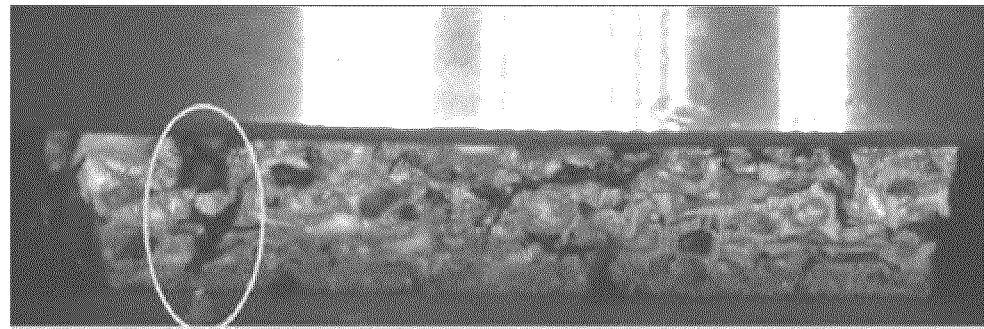
Figure 5H:
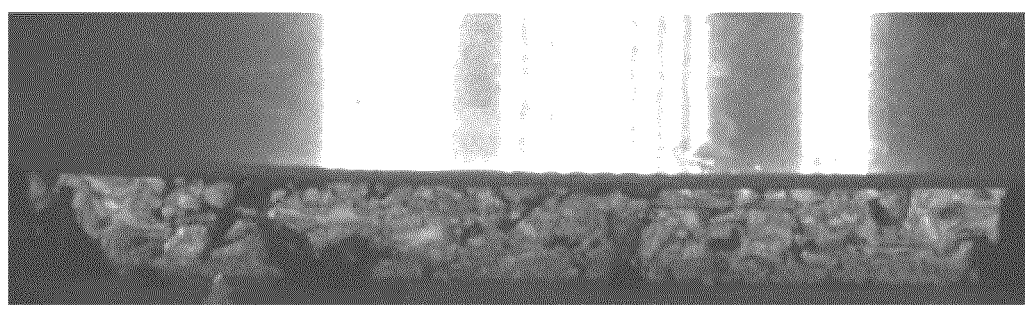
Figure 5I:
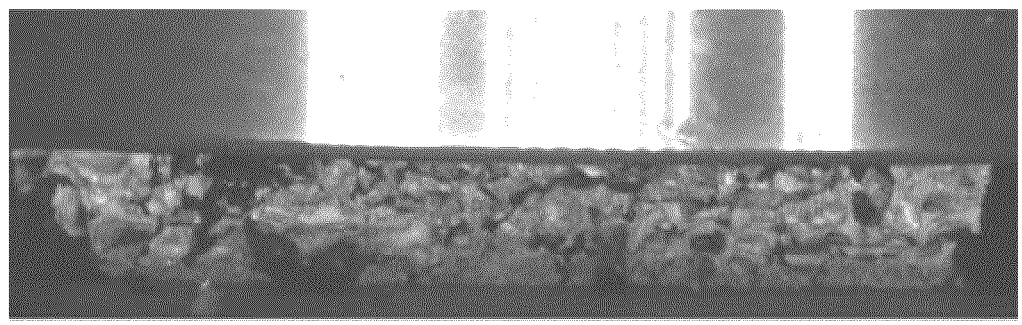
Figure 5J:
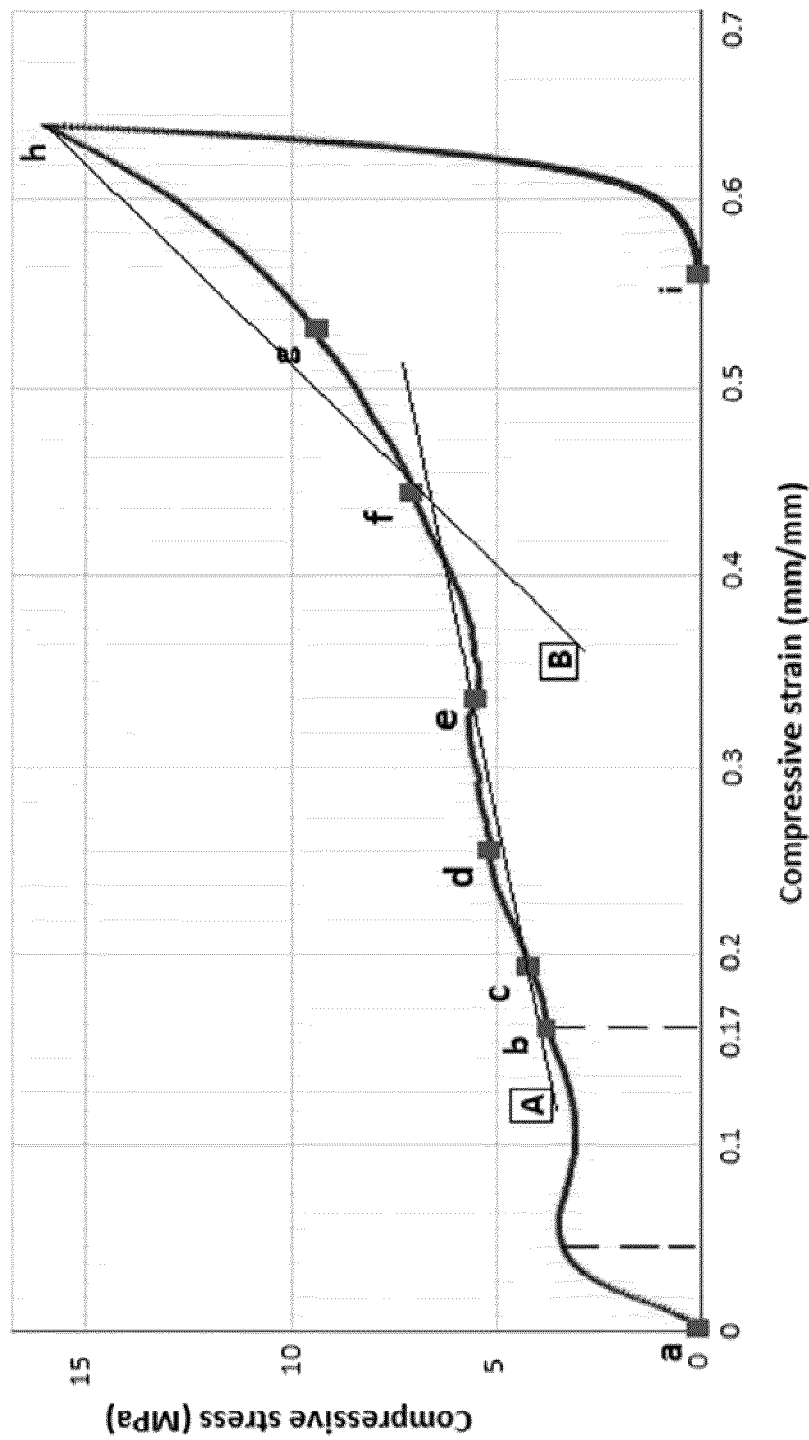
FIG. 5J is a graph showing a compressive stress-strain curve obtained for gradual transition regions (GTR).

The compressive stress-strain curve obtained from the test is presented in FIG. 5J. After the elastic deformation, once the applied stress exceeds the core strength, the foam starts to crush and compress at an almost constant stress (about 4 MPa) up to about 17% of strain (point b). At this stage, the weakest cells crush and thus the foam block does not experience any densification and all the applied energy is absorbed. By increasing the load, from point b to point h, the foam experiences both crushing and densification deformations and this is why the curve presents different slope for lines A and B. From point b to point f, the deformation is mainly associated to crushing rather than densification, while between point f to point h it is reversed. During crushing an amount of energy is absorbed which lowers the slope and for this reason the slope of line A is lower than B. As shown in FIG. 5J, two different failure modes occurred, layered crushing and longitudinal splitting. From point a to e by increasing the load, layered crushing happens starting from the weakest layer (top layer). At this stage, even though about the first third of the foam has failed, the other two thirds of the foam resist very well. At point e, by propagating the localized fractures, longitudinal splitting started and become more visible, as identified in FIG. 5E. From point e to point f, the foam undergoes simultaneously both failure modes while the foam skin and its close neighboring regions still resist very well. This highlights the advantage of the safety backup zone especially inside integral skin sandwiches. The GTR between the skin and core improves the safety backup zone which is necessary when the applied load is not fully known and could be highly exceeded. In addition, this GTR between the skin and core will minimize the delamination problem when the sandwich is subjected to in-plane loads.

Example 3—Functionally Graded Epoxy Foam

In a Functionally Graded Material (FGM), the composition and/or the structure gradually change over the volume, resulting in corresponding changes in the material properties. The variation of materials is designed according to certain function and specific application. After introducing the concept of functionally graded material in 1984, these kinds of new advanced composites have been increasing in different engineering fields. FGM are being made through various processes that can be approximately categorized based on the state of constituent materials.

i) Gaseous methods, for example chemical vapour deposition, have been frequently used to make thin FGM sheets. In this method the gradation of materials is controlled by the temperature and rate of carrier gas flow.

ii) Liquid state procedures like electrophoretic deposition and plasma spray are being used to fabricate functionally graded coatings. Another liquid process is centrifugal casting which is used to produce bulk FGM.

iii) Solid state methods such as powder metallurgy are used to fabricate FGM. In this method, the constituent materials, in a powder form, are chosen. Then they are perfectly mixed, compacted and sintered.

The fabrication methods mentioned above were mainly developed for metal and ceramic-based FGM and the fabrication methods for polymer-based functionally graded materials are limited. The gradation of materials in polymer-based FGM is made using filler particles or foaming agents. Another technique is bonding layers made of different porous polymers. Today, functionally graded epoxy foams are limited to syntactic foams in which the gradation is made by using hollow fillers. For the first time, a functionally graded epoxy foam has been made by controlling the pressure and thermal profiles rather than using hollow particles. The gradation can be designed according to certain functions and specific applications.

Fabrication Method of the Functionally Graded Epoxy Foam

Figure 6:
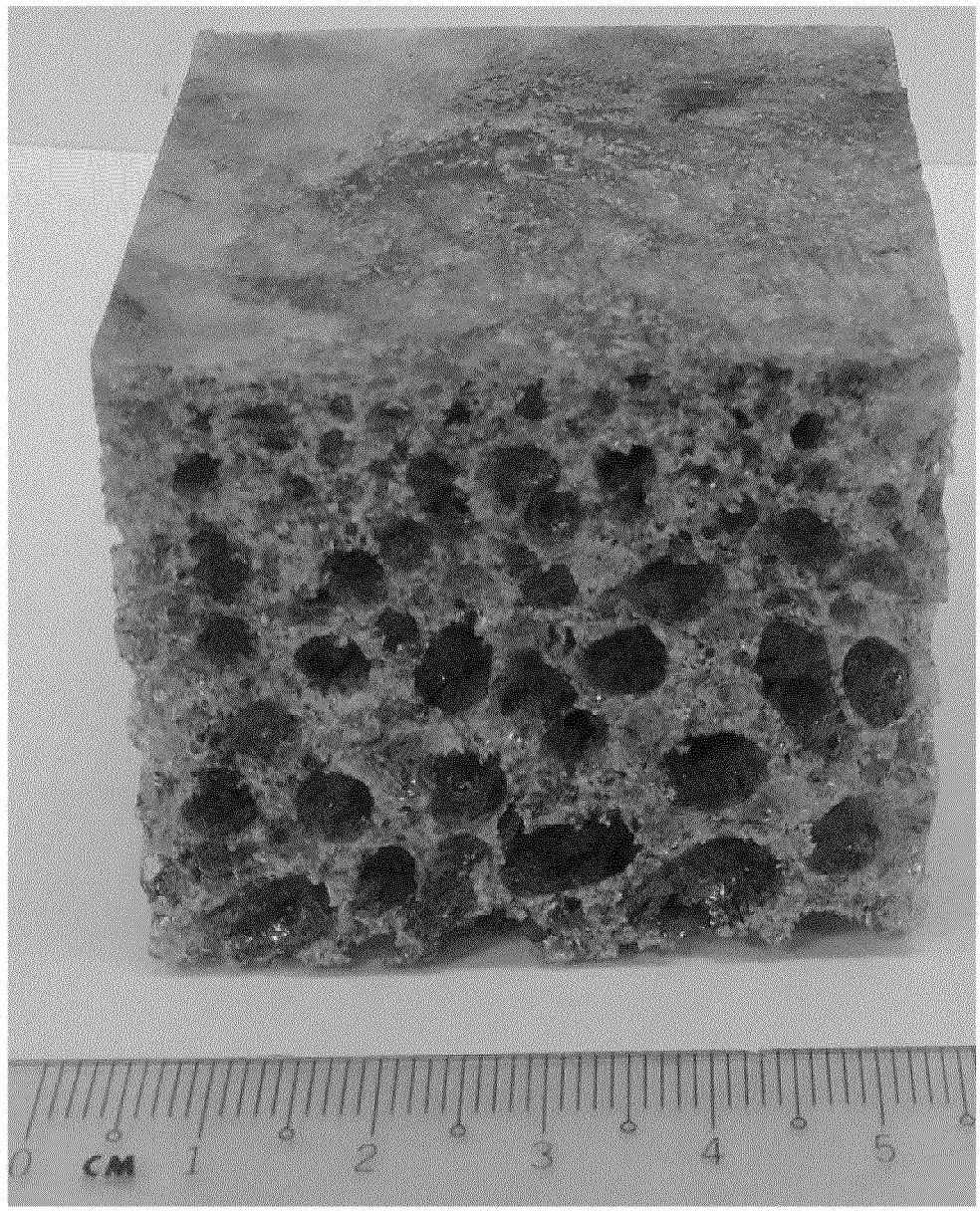
FIG. 6 is a photograph of a functionally graded epoxy foam.

A functionally graded epoxy foam with pore size ranging from less than about 1 mm to about 10 mm and an average density of about 160 kg/m$^3$ was produced, as shown in FIG. 6. The material was achieved by a controlled curing of an epoxy system reinforced with carbon fibers and foamed using dry-ice, through sequences of steps a, b, g, h, f, i, j, k, l, m and n. An epoxy system with high degree of hardness and mechanical properties (Epicote 1006) was selected (step a). To decrease the viscosity and to enable a better wetting of the fillers, epoxy resin was preheated to 45° C. (step b) and combined with the hardener (polyamide) with mixing ratio of 10:6 using a dual hand mixer (step g). The mixture was subsequently saturated with $CO_2$ through dispersion of 4% wt. dry-ice using a mixer (step h). Subsequently, 0.4% wt. of short carbon fibers (3-6 mm) were manually added to the mixture using a stick (step f). The mixture was then poured into a pre-waxed cavity (step i) and cured (step j). The product was then post-cured to complete the polymerization process (step k).

The above process was controlled by especially applying steps l, m, and n. To elaborate, the mixture composed of 130 g epoxy, its hardener and fillers, was casted into a cubic container with a volume of 3375 cm$^3$ (15 cm×15 cm×15 cm). Dimensions and aspect ratio of the container have significant effects on the pressure profile and thus expansion ratio (step m). The ambient temperature was 27° C., and to accelerate the reaction, immediately after applying step i, the surface of the mixture was covered with a very thin plastic film which decreases removal of heat generated by the exothermic reaction of epoxy with hardener (step n). As soon as the expansion began, the bottom of the container was placed on a cold water bath (below 25° C.) to decrease the reaction rate at the regions near to bottom of the foam material (step l), resulting in smaller pores and thus gradation.

Example 4—Microcellular Epoxy/CNT Nanocomposite

Recently, nanocomposites have attracted much attention in different engineering fields. Depending on the type of nanoparticles used, they can affect the properties of final nanocomposite such as electrical, thermal and mechanical properties. Among the nanoparticles, CNT are attractive candidates with unique properties such as high strength, high stiffness, high thermal conductivity and high electrical conductivity which can be used to improve or modify the properties of the epoxy matrix. Recently, some attempts have been successfully made to produce epoxy foam/CNT composites, but most of them were limited to syntactic foams in which higher density porous fillers are used. More recently, a microcellular epoxy/CNT nanocomposite for electromagnetic interference shielding application was produced. However, their approach was limited to a tedious and time consuming batch foaming process. The present is a convenient method for in-situ fabrication of lightweight high performance microcellular epoxy/CNT nanocomposites.

Fabrication Method of the Microcellular Epoxy/CNT Nanocomposites

Figure 7:
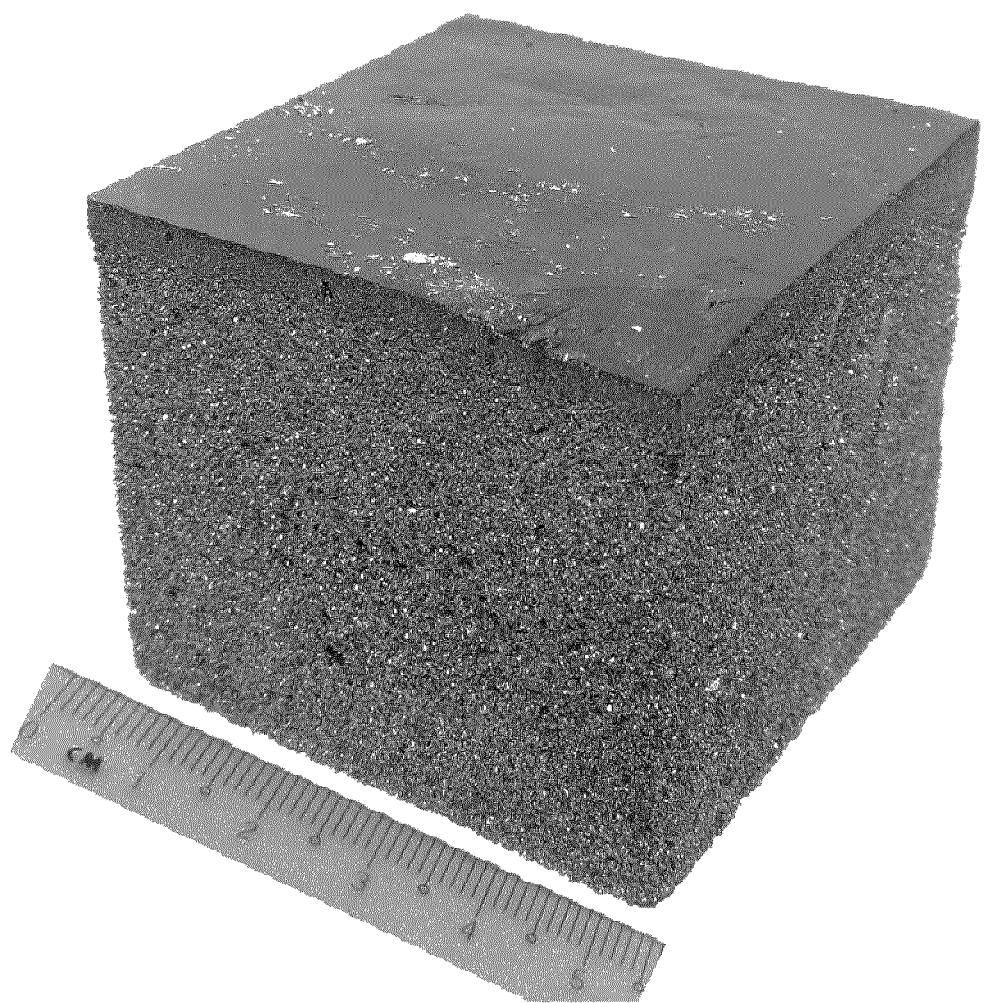
FIG. 7 is a photograph of a microcellular epoxy/carbon nanotube (CNT) nanocomposite.

The microcellular epoxy/CNT nanocomposite material having an average density of about 140 kg/m$^3$ was achieved, as shown in FIG. 7, by a controlled curing of a high performance thermoset resin mixed with CNT and foamed using dry ice through sequence of steps a, b, f, g, h, i, j, k, l, m and n. An epoxy system with low viscosity, high degree of hardness and mechanical properties (epoxy 335) was selected (step a). Before being used, carbon nanotubes (CNT) (1.75% wt.) were dispersed in acetone (at least 100 times of CNT weight) using ultrasonication. To decrease the viscosity and to enable a better dispersion of the fillers, the epoxy resin was preheated to 65° C. (step b). The CNT/acetone suspension was manually combined with epoxy resin using a stick (step f) and the mixture was again subjected to ultrasonication. After removing the acetone, through degassing in a vacuum oven at 70° C., the epoxy resin combined with the hardener (335 part B, containing alkyl ether amine) with a mixing ratio of 100:38 using a dual hand mixer (step g). The mixture was subsequently saturated with $CO_2$ through dispersion of at least 4% wt. dry-ice using a mixer (step h). The mixture was then poured into a pre-waxed cavity (step i) and cured (step j). The product was then post-cured to complete the polymerization process (step k).

To achieve the nanocomposite foam with a microcellular structure the above process was controlled by especially applying steps l, m, and n. To elaborate, immediately after step h, the temperature of the mixture was kept below 30° C. for 28 minutes by regularly adding dry-ice, totalling about 0.5% wt., to decrease the reaction rate (step l). The mixture composed of 100 g epoxy, its hardener and fillers was then casted into a cubic container with a volume of 3375 cm$^3$ (15 cm×15 cm×15 cm). Dimensions and aspect ratio of the container have significant effects on the pressure profile and thus expansion ratio (step m). The ambient temperature was 22° C. and, to accelerate the reaction, the mixture was kept in an oven with a temperature of 60° C. for 16 minutes (step n).

Example 5—Layered Epoxy Foam System

Figure 8:
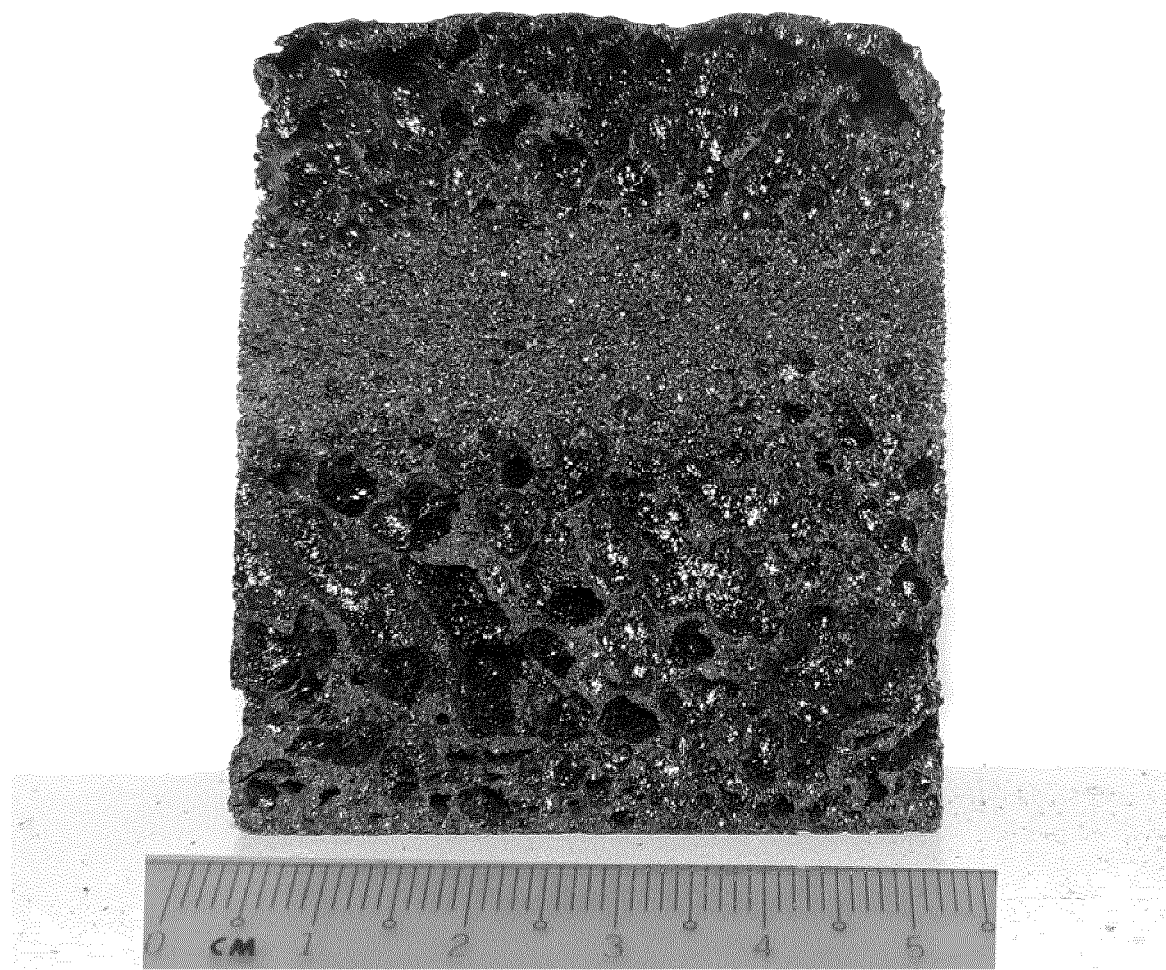
FIG. 8 is a photograph of a three-layer epoxy foam system.

Polymer foams having different density show different properties. To control and improve the properties, the concept of layered foams was recently proposed and attracted much attention of researchers. A layered polymer foam system is composed of layers with different density and have the potential to show interesting combination of low density with excellent physical properties. Today, layered systems are mostly made through bonding different layers of polymer foams. Another approach is to produce a layered polymer through a one-step process to decrease the processing time and costs and to provide mechanically stronger interface between the layers, compared to bonded systems. The method presented herein enables the production of layered thermoset foams through a one-step process. It is used to produce a three-layered epoxy foam system having a middle layer with an average density of 102 kg/m$^3$ and pores sizes less than 1 mm, combined with two layers, at the bottom and top, with an average density of about 120 kg/m$^3$ and pores ranging from 1 mm to near 1 cm in size (see FIG. 8). As can be seen, the outer layers of the foam have increased pore size as well as increased wall thickness and interpore spacing compared to the middle layer. Since the material is produced through a one-step method, the layers are chemically connected (e.g. chemical cross-linked) and the pore size and density vary gradually and smoothly from one layer to another minimizing stress concentration and thus delamination possibility which is always of high concern in bonded layered systems. A potential application of the material is to be used as a crash absorber, for example in helmets, where the structures must absorb impact energy to protect either the rest of the structure or the cycler during impact loads, while being light weight and comfortable.

Fabrication Method of the Layered Epoxy Foam

The material was achieved by a controlled curing of a high performance thermoset resin mixed with CNT and foamed using dry ice through sequence of steps a, b, f, g, h, i, j, k, l, m and n. An epoxy system with low viscosity, high degree of hardness and mechanical properties (epoxy 335) was selected (step a). Before being used, carbon nanotubes (CNT) (2% wt.) were dispersed in acetone (at least 100 times of CNT weight) using ultrasonication. To decrease the viscosity and to enable a better dispersion of the fillers, epoxy resin was preheated to 65° C. (step b). The CNT/acetone suspension was manually combined with epoxy resin using a stick (step f) and the mixture was again subjected to ultrasonication. After removing the acetone, through degassing in a vacuum oven at 70° C., the epoxy resin combined with the hardener (335 part B, containing alkyl ether amine) with a mixing ratio of 100:38 using a dual hand mixer (step g). The mixture was subsequently saturated with $CO_2$ through dispersion of at least 4% wt. dry-ice using a mixer (step h). The mixture was then poured into a pre-waxed cavity (step i) and cured (step j). The product was then post-cured to complete the polymerization process (step k).

To achieve the nanocomposite foam with microcellular structure the above process was controlled by especially applying steps l and m. To elaborate, immediately after step h, the temperature of the mixture was kept below 30° C. for 22 minutes by regularly adding dry-ice totaling about 0.5% wt., to decrease the reaction rate (step l). The mixture composed of 180 g epoxy, its hardener and fillers was then casted into a cubic container with a volume of 8000 cm$^3$ (20 cm×20 cm×20 cm). Dimensions and aspect ratio of the container have significant effects on the pressure profile and thus expansion ratio (step m). As soon as the expansion began, the bottom of the container was placed into cold water (below 25° C.) and the temperature of the top surface of the foam materials was kept below 18° C. using dry ice powder, to decrease the reaction rate at the bottom and top regions, respectively (step l).

Example 6—Smart Nanocomposite Foam

A smart material is a designed structure for which its properties can be significantly managed in a controlled way by applying external excitation. Among the smart materials, shape memory polymers (SMP) have recently received increasing interest due to their unique advantages like large recovery ability and superior processability. After introducing the first SMP in 1984, several different types of SMP have been successfully developed. Forming SMP into a porous structure broadens its application due to its unique properties like high volume recovery, from compressive strain, to weight ratio. Recently, some research works have been conducted at developing composite SMP foam to improve/modify their properties using additives. But, simple addition of fillers/additives will significantly affect the foaming process, leading to foam performances deterioration. A smart composite foam showing shape memory property and having both low density and compressibility attributes of foams has been developed. Due to the nature of the resin used (epoxy), the material can be heated up above its transition temperature, deformed into temporary/secondary shape, and subsequently cooled down below its transition temperature to be stored in a secondary geometry. Thereafter, it can be activated by heating up above its transition temperature to return to its primary geometry. A main advantage of this smart nanocomposite foam over other similar products is the high rigidity, provided by combination of epoxy resin and CNT.

Fabrication Method of the Smart Nanocomposite Foam

Figure 9:
FIG. 9 is a photograph of a smart nanocomposite foam.

Using the present method, a smart nanocomposite epoxy foam with pore size ranging from 1 mm to about 6 mm and a density of 195 kg/m$^3$ was produced (FIG. 9). The material was achieved by a controlled curing of a high performance thermoset resin mixed with CNT and foamed using dry ice through sequence of steps a, b, f, g, h, i, j, k, l, m and n. An epoxy system with low viscosity, high degree of hardness and mechanical properties (epoxy 335) was selected (step a). Before being used, carbon nanotubes (CNT) (2.75% wt.) were dispersed in acetone (at least 100 times of CNT weight) using ultrasonication. To decrease the viscosity and to enable a better dispersion of the fillers, the epoxy resin was preheated to 65° C. (step b). The CNT/acetone suspension was manually combined with epoxy resin using a stick (step f) and the mixture was again subjected to ultrasonication. After removing the acetone, through degassing in a vacuum oven at 70° C., the epoxy resin was combined with the hardener (335 part B, containing alkyl ether amine) with a mixing ratio of 100:38 using a dual hand mixer (step g). The mixture was subsequently saturated with $CO_2$ through dispersion of at least 4% wt. dry-ice using a mixer (step h). The mixture was then poured into a pre-waxed cavity (step i) and cured (step j). The product was then post-cured to complete the polymerization process (step k).

To achieve the shape memory nanocomposite foam, the above process was controlled by especially applying steps l, m, and n. To elaborate, immediately after step h, the temperature of the mixture was kept below 30° C. for 7 minutes by regularly adding dry-ice totaling about 0.5% wt., to decrease the reaction rate (step l). The mixture composed of 150 g epoxy, its hardener and fillers was then casted into a cubic container with a volume of 3375 cm$^3$ (15 cm×15 cm×15 cm). Dimensions and aspect ratio of the container have significant effects on the pressure profile and thus expansion ratio (step m). The ambient temperature was 22° C. and, to accelerate the reaction, the material was kept in an oven with temperature of 60° C. for 5 minutes (step n).

Example 7—Composite Foams Using Waste Materials

Figure 10:
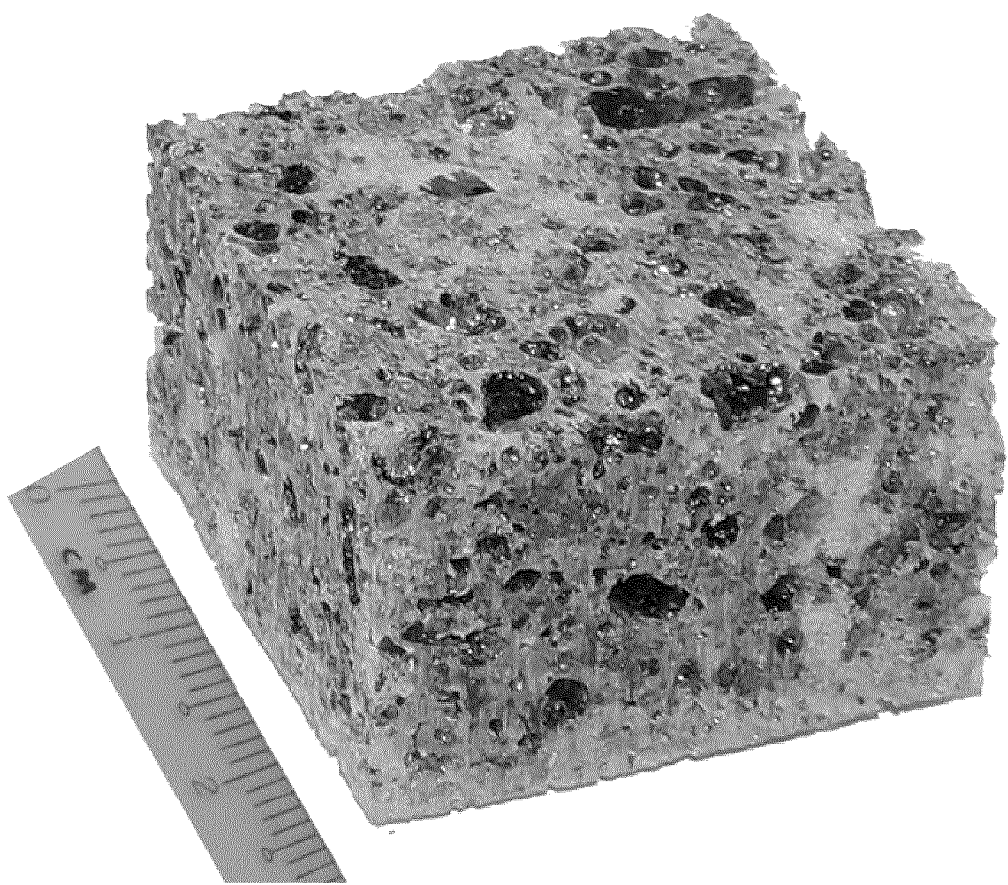
FIG. 10 is a photograph of a composite foam made using waste epoxy powder.
Figure 11:
FIG. 11 is a photograph of a composite foam made using waste rubber powder.
Figure 12:
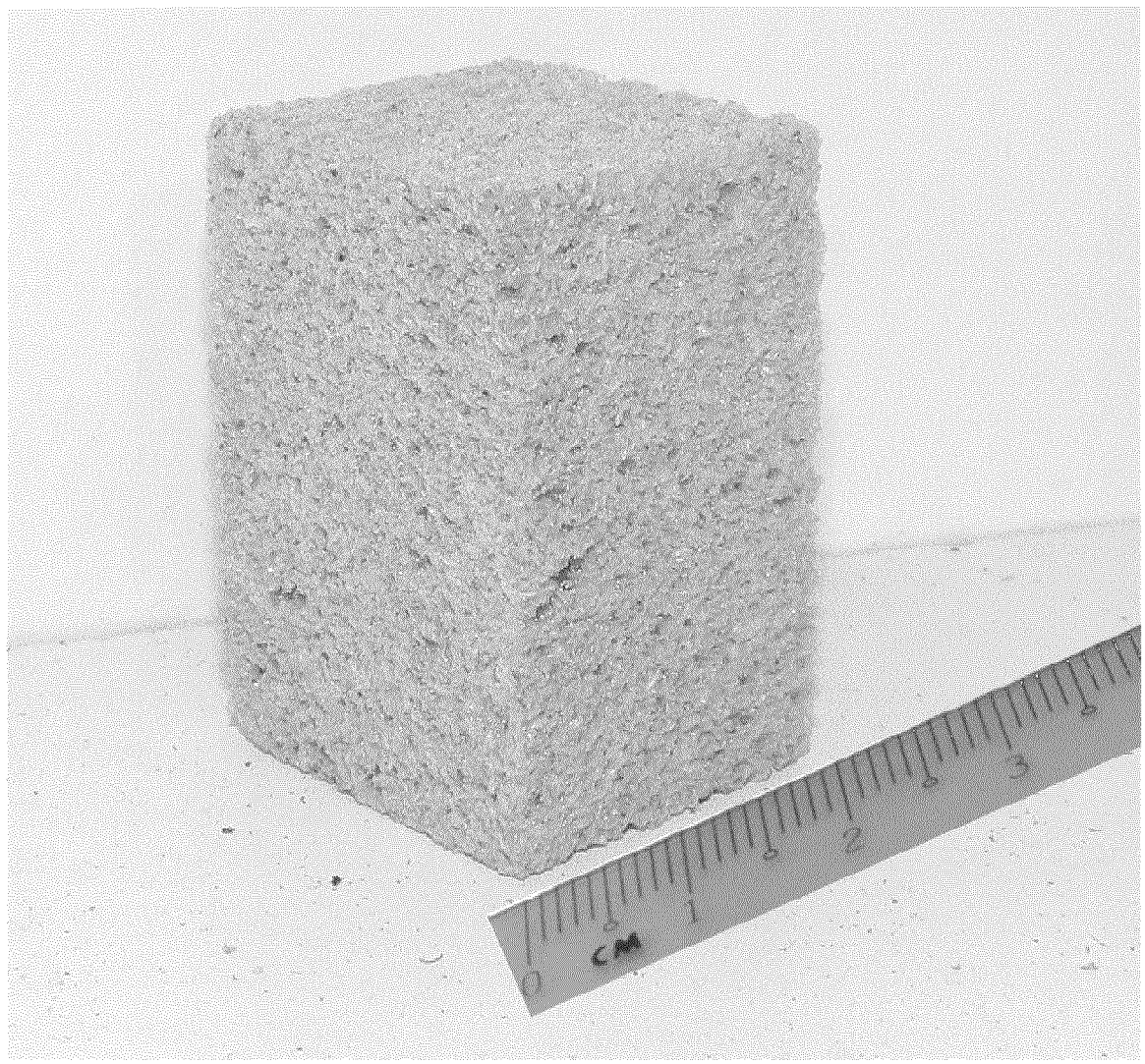
FIG. 12 is a photograph of a composite foam made using waste wood powder.

The high demand for elastomer and thermoset based materials has resulted in a rise in waste volumes. Recycling of thermoset and elastomer polymers, compared to thermoplastics, is very difficult due to their cross-linked nature. Although different thermal and chemical recycling processes have been proposed, their high cost and energy consumption have limited their application. Another approach is to use their waste powder as a filler in the processing of composite materials. However, some problems are also associated with this method, resulting in lower final product performance. For example, the presence of gas bubbles in the recycled materials, especially thermoset wastes, will produce voids in the final product, decreasing the mechanical properties. The idea is to use such wastes to produce composite foams where the presence of these gas bubbles is not a problem. The foaming method presented herein enables a simple production of composite foams using waste materials. Waste epoxy, rubber and wood powders were used to produce three different composite foams as shown in FIGS. 10-12, respectively. Referring to FIG. 10, the composite foam made using waste epoxy powder has a density of 285 kg/m$^3$. Referring to FIG. 11, the composite foam made using waste rubber powder with a density of 125 kg/m$^3$. Referring to FIG. 12, the composite foam made using waste wood powder with a density of 150 kg/m$^3$.

The embodiments of the paragraphs of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the embodiments of any paragraphs and the methods and composites of the SUMMARY are hereby covered by the present disclosure.

REFERENCES

[1] Mrozek R A, Lenhart J L, Berg M C, Robinette E J. POROUS POLYMER COMPOSITES, United States Patent Publication 20160030625, 2016.

[2] Gu R, Sain M, Konar S. Development and characterization of flexible epoxy foam with reactive liquid rubber and starch. Journal of Materials Science. 2014; 49: 3125-3134.

[3] Ren Q, Xu H, Yu Q, Zhu S. Development of Epoxy Foaming with $CO_2$ as Latent Blowing Agent and Principle in Selection of Amine Curing Agent. Ind. Eng. Chem. Res. 2015, 54 (44): 11056-11064.

[4] Ellson G, Prima M D, Ware T, Tang X, Voit W. Tunable thiol-epoxy shape memory polymer foams. Smart Materials and Structures. 2015; 24: 055001.

[5] Frisch L C. History of Science and Technology of Polymeric Foams, Journal of Macromolecular Science: Part A—Chemistry. 1981; 15(6), 1089-1112.

[6] Rong T, Ping C, Jianhua W, Ming Z. High-temperature-resistance high-strength epoxy foam plastic and preparation method thereof. China Patent Application CN102863747 A, 2012.

[7] Pop-Iliev R, Dong N, Xu D, Park C B. Visualization of the foaming mechanism of polyethylene blown by chemical blowing agents under ambient pressure. Advances in Polymer Technology, 2007; 26: 213-222.

[8] Bhat P, Zegeye E, Ghamsari A K, Woldesenbet E. Improved Thermal Conductivity in Carbon Nanotubes-Reinforced Syntactic Foam Achieved by a New Dispersing Technique. Journal of the Minerals, Metals & Materials Society. 2015; 67: 2848-2854.

[9] Gungor S, Bakis C E. Indentation damage detection in glass/epoxy composite laminates with electrically tailored conductive nanofiller. Journal of Intelligent Material Systems and Structures, 2016; 27: 679-688.

[10] Withers G J, Yu Y, Khabashesku V N, Cercone L, Hadjiev V G, Souza J M, Davis D C. Improved mechanical properties of an epoxy glass-fiber composite reinforced with surface organomodified nanoclays, Compos. Part B-Eng. 2015; 72: 175-182.

[11] Li J, Zhang G, Ma Z, Fan X, Qin J, Shi X. Morphologies and electromagnetic interference shielding performances of microcellular epoxy/multi-wall carbon nanotube nanocomposite foams. Composites Science and Technology. 2016; 129: 70-78.

[12] Dixit A, Dubey P K, Laksanangam T. Epoxy foam resin, U.S. Pat. No. 8,262,955 B2, 2012.

[13] Fabrizio Q, Loredana S, Anna S E. Shape memory epoxy foams for space applications, Materials Letters. 2012; 69: 20-23.

[14] Zegeye E, Ghamsari A K, Woldesenbet E. Mechanical properties of graphene platelets reinforced syntactic foams, Composites: Part B. 2014; 60: 268-273.

[15] Czaplicki M J, Kosal D J, Madaus K. Two-component (epoxy/amine) structural foam-in-place material, U.S. Pat. No. 6,787,579 B2, 2004.

[16] Antunes M, Velasco J I. Multifunctional polymer foams with carbon nanoparticles Progress in Polymer Science. 2014; 39: 486-509.

[17] Wu Y. Carbon dioxide treatment of epoxy resin compositions, United States patent application U.S. Ser. No. 06/495,294, 1984.

[18] Gupta N, Kishore, Woldesenbet E, Sankaran S. Studies on compressive failure features in syntactic foam material. Journal of Materials Science, 2001; 36: 4485-4491.

[19] Gupta N, Maharsiab R, Jerrob H D. Enhancement of energy absorption characteristics of hollow glass particle filled composites by rubber addition. Materials Science and Engineering: A. 2005; 395: 233-240.

[20] Kim H S, Plubrai P. Manufacturing and failure mechanisms of syntactic foam under compression. Composites Part A: Applied Science and Manufacturing. 2004; 35: 1009-1015.

[21] Gupta N. A functionally graded syntactic foam material for high energy absorption under compression, Materials Letters. 2007; 61: 979-982.

[22] Wu X, Dong L, Zhang F, Zhou Y, Wang L, Wang D, Yin Y. Preparation and characterization of three phase epoxy syntactic foam filled with carbon fiber reinforced hollow epoxy macrospheres and hollow glass microspheres. Polymer Composites. 2016; 2: 497-502.

[23] Şerban D A, Weissenborn O, Geller S, Marsavina L, Gude M. Evaluation of the mechanical and morphological properties of long fibre reinforced polyurethane rigid foams. Polymer Testing. 2015; 49: 121-127.

[24] Kern W T, Kim W, Argento A, Lee E, Mielewski D F. Mechanical behavior of microcellular, natural fiber reinforced composites at various strain rates and temperatures. Polymer Testing. 2014; 37: 148-155.

[25] Zhou Q, Mayer R R. Characterization of Aluminum Honeycomb Material Failure in Large Deformation Compression, Shear, and Tearing. Journal of Engineering Materials and Technology. 2002; 124: 412-420.

[26] Wanga Y, Liew J Y R. Blast performance of water tank with energy absorbing support. Thin-Walled Structures. 2015; 96: 1-10.

[27] Zhou G, Hill M, Loughlan J, Hookham N. Damage characteristics of composite honeycomb sandwich panels in bending under quasi-static loading. Journal of Sandwich Structures and Materials. 2006; 8: 55-90.

[28] Sharifishourabi G, Ayob A, Gohari S, Yazid M Y, Sharifi S, Vrcelj Z. Flexural behavior of functionally graded slender beams with complex cross-section. Journal of Mechanics of Materials and Structures. 2015; 10: 1-6.

[29] Zhou C, Wang P, Li W. Fabrication of functionally graded porous polymer via supercritical $CO_2$ foaming. Composites Part B: Engineering. 2011; 42: 318-325.

[30] Gojny F H, Wichmann M, Fiedler B, Schulte K. Influence of different carbon nanotubes on the mechanical properties of epoxy matrix composites—a comparative study. Composites Science and Technology. 2005; 65: 2300-2313.

[31] Lee S J, Zhu L, Maia J. The effect of strain-hardening on the morphology and mechanical and dielectric properties of multi-layered PP foam/PP film. Polymer. 2015; 70: 173-182.

[32] Zhao T B, Zhang X L, Wu H, Guo S Y, Sun X J, Liang, W B. Rheology, morphology, and mechanical properties of HMSPP/POE blends and its alternate layered foam. Journal of Applied Polymer Science. 2015; 132, 41339 (1-7).

[33] Lelieveld C, Jansen K, Teuffe P. Mechanical characterization of a shape morphing smart composite with embedded shape memory alloys in a shape memory polymer matrix. Journal of Intelligent Material Systems and Structures. 2016; 27: 2038-2048.

[34] Huang W M, Lee C W, Teo H P. Thermomechanical Behavior of a Polyurethane Shape Memory Polymer Foam. Journal of Intelligent Material Systems and Structures. 2006; 17: 753-760.

[35] Ohki T, Ni Q-Q, Ohsako N, Iwamoto M. Mechanical and shape memory behavior of composites with shape memory polymer. Composites Part A: Applied Science and Manufacturing. 2004; 35: 1065-1073.

[36] Jimenez G, Jana S C. Composites of carbon nanofibers and thermoplastic polyurethanes with shape-memory properties prepared by chaotic mixing. Polymer Engineering and Science. 2009; 49: 2020-2030.

[37] Singhal P, Rodriguez J N, Small W, Eagleston S, Van de Water J, Maitland D J, Wilson T S. Ultra low density and highly crosslinked biocompatible shape memory polyurethane foams. Journal of Polymer Science Part B: Polymer Physics, 2012; 50: 724-737.

[38] Kang S M, Kwon S H, Park J H, Kim. BK. Carbon nanotube reinforced shape memory polyurethane foam. Polymer Bulletin. 2013; 70: 885-893.

[39] Kalita H, Karak N. Hyperbranched polyurethane/$Fe_3O_4$ thermosetting nanocomposites as shape memory materials. Polymer Bulletin. 2013; 70: 2953-2965.

[40] Squeo E A, Quadrini F. Shape memory epoxy foams for space applications. Materials Letters. 2012; 69: 20-23.

[41] Pickering S J. Recycling technologies for thermoset composite materials—current status. Composites Part A: Applied Science and Manufacturing, 2005; 37: 1206-1215.

[42] Thomason J L, Nagel U, Yan L, Sáez E. Regenerating the strength of thermally recycled glass fibres using hot sodium hydroxide. Composites Part A: Applied Science and Manufacturing, 2016; 87: 220-227.

[43] Shuaib N A, Mativenga P T. Energy demand in mechanical recycling of glass fibre reinforced thermoset plastic composites. Journal of Cleaner Production. 2016; 120: 198-206.

What is claimed is:

1. A method of producing a density-graded porous polymer composite, comprising:
    preparing a mixture comprising a resin, a curing agent, dry ice and optionally a filler;
    casting the mixture;
    curing the casted mixture to obtain the porous composite; and
    controlling the reaction rate of the casted mixture to obtain a density gradient in the porous composite.

2. The method of claim 1, wherein the controlling the reaction rate of the casted mixture comprises decreasing the reaction rate of a portion of the casted mixture.

3. The method of claim 2, wherein the decreasing the reaction comprises exposing a portion of the casted mixture to a decreased temperature so as to generate a density gradient in the porous composite, the portion of the casted mixture exposed to the decreased temperature having a smaller pore size compared to a portion of the casted mixture not exposed to the decreased temperature.

4. The method of claim 1, wherein the density-graded porous polymer composite comprises at least two integrally connected layers having different average pore sizes and/or average densities.

5. The method of claim 1, wherein said method comprises:
    preparing a mixture comprising a resin, a curing agent, dry ice and optionally a filler;
    adding additional dry ice to the mixture;
    casting the mixture;
    curing the mixture to obtain the porous composite;
    increasing the temperature of the mixture after casting to increase the reaction rate; and
    exposing a portion of the casted mixture to a decreased temperature so as to form a density gradient in the polymer composite.

6. A method of producing a density-graded porous polymer composite, comprising:
    preparing a mixture comprising a resin, a curing agent, dry ice and optionally a filler;
    forming a first polymer composite layer having a first average density and/or a first average pore size; and
    varying one or more parameters to obtain a second polymer composite layer having a second average density and/or a second average pore size,
    wherein the parameters are chosen from amount of dry ice, time of exposure to dry ice, pressure of the mixture, temperature of the mixture, and viscosity of the mixture;
    and wherein the first and second polymer composite layers are formed by a single unitary continuous material.

7. A method of producing a layered porous polymer composite, comprising:
    preparing a mixture comprising a resin, a curing agent, dry ice and optionally a filler;
    adding additional dry ice to the mixture;
    casting the mixture;
    curing the mixture to obtain the porous composite; and
    exposing top and bottom portions of the casted mixture to a decreased temperature so as to form density gradients in the polymer composite.

* * * * *